United States Patent
Di Pasquale et al.

(10) Patent No.: US 6,556,346 B1
(45) Date of Patent: Apr. 29, 2003

(54) OPTICAL AMPLIFYING UNIT AND OPTICAL TRANSMISSION SYSTEM

(75) Inventors: Fabrizio Di Pasquale, Milan (IT); Fausto Meli, Piacenza (IT); Giovanni Sacchi, Milan (IT); Silvia Turolla, Seriate (IT)

(73) Assignee: Corning O.T.I.SpA, Milan (IT)

( * ) Notice: Subject to any disclaimer, the term of this patent is extended or adjusted under 35 U.S.C. 154(b) by 0 days.

(21) Appl. No.: 09/400,275

(22) Filed: Sep. 21, 1999

Related U.S. Application Data

(60) Provisional application No. 60/102,085, filed on Sep. 29, 1998.

(30) Foreign Application Priority Data

Sep. 22, 1998 (EP) .............................. 98117898

(51) Int. Cl.[7] .................................................. H01S 3/00
(52) U.S. Cl. ................................................... 359/341.5
(58) Field of Search ........................... 359/341.5, 160; 372/6

(56) References Cited

U.S. PATENT DOCUMENTS

| | | |
|---|---|---|
| 5,225,925 A | 7/1993 | Grubb et al. |
| 5,500,764 A | 3/1996 | Armitage et al. |
| 5,696,782 A | 12/1997 | Harter et al. |

FOREIGN PATENT DOCUMENTS

| | | | |
|---|---|---|---|
| EP | 0 533 324 A2 | | 3/1993 |
| EP | 0 803 944 A2 | | 10/1997 |
| EP | 0 858 976 A2 | | 8/1998 |
| EP | 0 964 275 A1 | | 12/1999 |
| EP | 0 989 693 A1 | * | 3/2000 |
| JP | 2000101173 A | * | 4/2000 |
| WO | 95/10868 | | 4/1995 |

OTHER PUBLICATIONS

Federighi et al, "Erbium–Doped Waveguide Devices For WDM Applications" (1998), IEEE, pp 85 and 86.*
Artiglia et al, "Gain–Slope Measurements On Erbium–Doped Amplifiers With Different Active Fibers" (1997), IEE, ECOC 97 Conference Publication No. 448, pp. 123–125.*
Grubb, S.G. et al., "+24.6 dBm Output Power Er/Yb Codoped Otpical Amplifier Pumped by Diode–Pumped Nd: YLF Laser", Electronics Letters, vol. 28, No. 13, pp. 1275–1276, (1992).
Minelly, J.D. et al., "Diode–Array Pumping of $Er^{3+}/Yb^{3+}$ Co–Doped Fiber Lasers and Amplifiers", IEEE Photonics Technology Letters, vol. 5, No. 3, pp. 301–303 (1993).

(List continued on next page.)

Primary Examiner—Mark Hellner
(74) Attorney, Agent, or Firm—Svetlana Z. Short; Jennifer Medlin

(57) ABSTRACT

An optical amplifying unit (100; 100') for amplifying optical signals in an optical transmission system has an amplification wavelength band with a lower wavelength limit greater than 1570 nm and includes an input (101) for the input of optical signals, an output (102) for the output of optical signals and an optical amplifier (104) interposed between the input (101) and the output (102) to amplify the optical signals. The optical amplifier (104) includes an amplification fiber (108) co-doped with erbium and ytterbium, at least a pump source (109, 110) to generate pump radiation and at least an optical coupler (111, 112) optically coupling the pump sources (109, 110) to the amplification fiber (108). The optical amplifying unit has a power gain of at least 31 dB when the optical signals have an input power of at least –10.5 dBm and wavelengths within the amplification wavelength band.

33 Claims, 14 Drawing Sheets

OTHER PUBLICATIONS

Maker, G.T. et al., "1.56μm Yb–Sensitised Er Fibre Laser Pumped by Diode–Pumped Nd: Yag and Nd: YLF Lasers", Electronics Letters, vol. 24, No. 18, pp. 1160–1161 (1988).

Masuda, H., et al. "Wideband, gain–flattened, Erbium–doped Fibre Amplifiers with 3dB bandwidths of >50nm", Electronics Letters, vol. 33, No. 12, pp. 1070–1072, (1997).

Ono, H., et al. "Gain–Flattened $Er^{3+}$–Doped Fiber Amplifier for a WDM signal in the 1.57–1.60–μm Wavelength Region", IEEE Photonics Technology Letters, vol. 9, No. 5, pp. 596–598, (1997).

Jolley N.E., et al. "Demonstration of low PMD and Negligible Multipath Interference in an Ultra Flat Broad Band EDFA Using a Highly Doped Erbium Fibre", pp. 124–127 (1998).

* cited by examiner

OPTICAL AMPLIFYING UNIT AND OPTICAL TRANSMISSION SYSTEM

This application claims the benefit of Provisional Application No. 60/102,085 filed Sep. 29, 1998.

It is an object of the present invention to provide an optical amplifying unit to be used for optical telecommunications. The invention also relates to an optical transmission system, more particularly a wavelength division multiplexing (WDM) optical transmission system, which uses the above-mentioned optical amplifying unit. The optical amplifying unit of the invention is also adapted to be used in analog CATV systems.

In WDM optical transmission systems, transmission signals including several optical channels are sent over a same line (that includes at least an optical amplifier) by means of wavelength division multiplexing. The transmitted channels may be either digital or analog and are distinguishable because each of them is associated with a specific wavelength.

Present-day long-distance high-capacity optical transmission systems use optical fiber amplifiers that, differently from previously used electronic regenerators, do not need OE/EO conversion. An optical fiber amplifier includes an optical fiber of preset length, having the core doped with one or more rare earths so as to amplify optical signals by stimulated emission when excited by pump radiation.

Optical fibers doped with erbium (Er) have been developed for use as both optical amplifiers and lasers. These devices are of considerable importance since their operating wavelength coincides with the third window for optical fiber communications, around 1550 nm. EP patent application No. 98110594.3 in the name of the Applicant proposes a thirty-two channels WDM optical transmission system that uses erbium-doped fiber amplifiers (EDFAs) in the wavelength bands 1529–1535 nm and 1541–1561 nm.

Several methods have been proposed to improve the system performances, for example in terms of amplification gain and amplification bandwidth.

One technique for improving the system performances consists in co-doping an erbium-doped amplification fiber with ytterbium (Yb). Co-doping an active fiber with erbium and ytterbium not only broadens the pump absorption band from 800 nm to 1100 nm, offering greater flexibility in selection of the pump wavelength, but also greatly increases the ground state absorption rate due to the higher absorption cross section and dopant solubility of ytterbium. The ytterbium ions absorb much of the pump light and the subsequent cross relaxation between adjacent ions of erbium and ytterbium allows the absorbed energy to be transferred to the erbium system. As described in Grubb et al., "+24.6 dBm output power Er/Yb co-doped optical amplifier pumped by diode-pumped Nd:YLF laser", Electronics Letters, 1992, 28, (13) pp. 1275–1276, and in Maker, Ferguson, "1.56 µm Yb-sensitized Er fibre laser pumped by diode-pumped Nd:YAG and Nd:YLF lasers", Electronics Letters, 1988, 24, (18), pp. 1160–1161, the co-doping technique may be applied to efficiently excite fiber amplifiers and lasers through direct pumping in the long wavelength tail of ytterbium absorption spectrum. This pumping is preferably performed by means of diode-pumped solid state lasers, for example 1047 nm Nd:YLF lasers or 1064 nm Nd:YAG lasers.

Using an erbium and ytterbium co-doped amplification fiber to amplify communication signals is further described in European patent application EP 0 803 944 A2 and in U.S. Pat. No. 5,225,925. EP 0 803 944 A2 refers to a multistage Er-doped fiber amplifier (EDFA) operating in the wavelength band 1544–1562 nm and comprising a first stage that includes Er and Al and a second stage that includes Er and a further rare earth element, for example Yb. Such multistage EDFA can have advantageous characteristics in the cited wavelength band over the all-erbium amplification systems, e.g. a relatively wide flat gain region, and relatively high output power, without significant degradation of the noise figure. However, the Applicant noted that the amplifier proposed in EP 0 803 944 A2 offers no advantages in terms of number of transmitted channels, the amplification bandwidth being still limited to the relatively narrow (and largely exploited) 1544–1562 nm band. Furthermore, the Er/Yb second stage is pumped by means of a diode-pumped Nd-doped fiber laser emitting at 1064 nm. This pump source, largely used for the excitation of mono-modal amplification fiber, is relatively expensive and cumbersome.

U.S. Pat. No. 5,225,925 relates to an optical fiber for amplifying or sourcing a light signal in a single transverse mode. The fiber comprises a host glass doped with erbium (Er) and a sensitizer such as ytterbium (Yb) or iron (Fe). Preferably the host glass is a doped silica glass (e.g. phosphate or borate doped). The Applicant noted that U.S. Pat. No. 5,225,925 proposes an amplification fiber that, due to the shape of its gain curve, is particularly adapted for the transmission of a single channel at 1535 nm but is not suitable for WDM transmissions. Moreover, such an amplification fiber is adapted to be pumped by means of a diode-pumped Nd-doped fiber laser that has the above mentioned disadvantages.

Neither EP 0 803 944 A2 nor U.S. Pat. No. 5,225,925 address amplification by an Er/Yb co-doped optical amplifier of a signal in a wavelength band different from the transmission band around 1550 nm.

An improvement of Er/Yb amplification fibers has been obtained by means of the cladding pumping technique, which consist in pumping the active fiber in an inner cladding region surrounding the core, instead that directly in the core. Cladding pumping is a technique that allows high power broadstripe diodes and diode bars to be employed as efficient, low cost and small dimension pump sources for double-clad rare earth doped single-mode fibers. Output powers ranging from several hundred milliwatts to several tens of watts may be attained by this technique. A double-clad Er/Yb fiber pumped by diode arrays at 980 nm is described, for example, in Minelly et al., "Diode-array pumping of Er3+/Yb3+ co-doped fibre lasers and amplifiers", IEEE Photonics Technology Letters, 1993, 5, (3), pp. 301–303. The erbium-ytterbium co-doped scheme enables much higher ground state absorption for erbium in the band about 980 nm than singly-doped erbium fibers, resulting in much shorter optimum length. The technique of inserting the pump radiation into a portion of the fiber external the core (which can be identically identified as an inner cladding or an outer core) is also described, for example, in PCT patent application WO 95/10868 and in U.S. Pat. No. 5,696,782.

Several methods have also been proposed to increase the number of channels to be transmitted. One way to increase channel numbers is to narrow the channel spacing. However, narrowing channels spacing worsens nonlinear effects such as cross-phase modulation or four wave mixing, and makes accurate wavelength control of the optical transmitters necessary. Applicant has observed that a channel spacing lower than 50 GHz is difficult to achieve in practice do to the above reasons.

Another way to increase the channel number is to widen the usable wavelength bandwidth in the low loss region of the fiber. One key technology is optical amplification in the wavelength region over the conventional 1550 nm transmission band. In particular, the high wavelength band around 1590 nm, and precisely between 1565 nm and 1620 nm, is a very promising band for long-distance optical transmissions, in that a very high number of channels can be allocated in that band. If the optical amplifier for the 1565–1620 nm band must deal with a high number of channels, the spectral gain characteristics of such amplifier are fundamental to optimize the system's performances and costs. The use of the 1590 nm transmission wavelength region of erbium-doped fiber amplifiers in parallel to the 1530 and 1550 wavelength regions, is attractive and has been recently considered. As an additional advantage, by employing the 1590 nm wavelength region it is possible to use dispersion-shifted fiber (DSF) for WDM transmissions without any degradation caused by four-wave mixing.

Several articles in the patent and non-patent literature address amplification in the high wavelength transmission band (from 1565 nm up to 1620 nm). All these documents consider only erbium-doped fiber amplifiers.

The following documents propose several methods to enlarge the usable bandwidth to the high wavelength transmission band.

U.S. Pat. No. 5,500,764 relates to a $SiO_2$—$Al_2O_3$—$GeO_2$ single-mode optical fiber (having a length between 150 m and 200 m) doped with erbium, pumped by 1.55 $\mu$m and 1.47 $\mu$m optical sources and adapted to amplify optical signals between 1.57 $\mu$m and 1.61 $\mu$m.

Ono et al., "Gain-Flattened $Er^{3+}$-Doped Fiber Amplifier for a WDM Signal in the 1.57–1.60 $\mu$m Wavelength Region", IEEE PHOTONICS TECHNOLOGY LETTERS, Vol. 9, No. 5, May 1997, pp. 596–599, disclose a gain-flattened $Er^{3+}$-doped silica-based fiber amplifier for the 1.58 $\mu$m band WDM signal; different fiber lengths were tested and the authors found that 200 m was the optimum length of EDF (Erbium-Doped Fiber) for constructing an EDFA with high gain and low noise.

Masuda et al., "Wideband, gain-flattened, erbium-doped fibre amplifiers with 3 dB bandwidths of >50 nm", ELECTRONICS LETTERS, Jun. 5, 1997, Vol. 33, No. 12, pp. 1070–1072, propose a scheme with two-stage erbium-doped fibres and an intermediate equalizer, obtaining a 52 nm band (1556–1608 nm) for a silicate erbium-doped fiber amplifier and a 50 nm band (1554–1604 nm) for a fluoride erbium-doped fiber amplifier; in the case of a silicate erbium-doped fiber amplifier, the two stages include a 50 m EDF and a 26 m EDF, respectively.

Jolley et al., "Demonstration of low PMD and negligible multipath interference in an ultra flat broad band EDFA using a highly doped erbium fiber", "Optical Amplifiers and their Applications" Conference, Vail, Colo., Jul. 27–29 1998, TuD2-1/124–127 proposes a broad band EDFA which amplifies signals in the 1585 nm band using 45 m of erbium fiber and reaching a maximum external power of more than +18.3 dBm at 1570.

The Applicant has observed that a line EDFA adapted to amplify optical signals in the high wavelength band can amplify an optical signal having an input power of approximately −10 dBm to a maximum power value lower than 19 dBm, i.e. with a maximum gain of approximately 29 dB. An input power of approximately −10 dBm is a proper reference value, being typical for optical amplifiers in long-distance transmission systems. Lower input power are not recommended in that, although EDFAs have higher gains for low power input signals than for high power input signals, the ASE (amplified spontaneous emission) in this case increases to values such that the signal to noise ratio becomes to low. On the contrary, signal input powers over −10 dBm, obtainable for example to the detriment of transmission fiber length, tends to saturate the gain, leading to an undesirable waste of energy. An optical transmission system using EDFAs and transmitting sixty-four channels between 1575 nm and 1602 nm would provide a maximum power per channel, at the output of the line EDFAs, of about 0.2 dBm and would limit in practice the maximum span length to less than 100 km.

The Applicant has further observed that in an erbium-doped active fiber of a predetermined length, the curve of the gain vs. erbium concentration has an increase up to a maximum, corresponding to an optimum value of erbium concentration, and then a decrease. Higher gains are obtainable only increasing the length of the active region doped with erbium, i.e. increasing the active fiber length. Long-haul WDM optical transmission systems for the high wavelength band using conventional erbium-doped active fibers require fiber lengths of a few hundred meters to reach a relative high gain. Actually, special erbium-doped active fibers having a larger core diameter are used, which allow obtaining a relative high gain with fiber lengths down to 30–40 m.

The Applicant has found that, in the 1565–1620 nm band, transmission systems including erbium-ytterbium co-doped amplifiers provide very high performances, in particular they provide higher performances with respect to erbium-only doped optical amplifiers. In particular, the Applicant has found that an optical amplifying unit including an erbium-ytterbium co-doped fiber amplifier (single-stage or multi-stage), optimized in terms of length and doping, can provide very high gain and a very flat amplification band (±0.5 dB) in a wavelength region having a width of at least 27 nm and situated above 1565 nm. More in detail, the Applicant has found that an optical amplifying unit including an optimized erbium-ytterbium co-doped fiber amplifier can provide, in the 1575–1602 nm wavelength region, an output signal power up to 23 dBm in response to an input of approximately −10 dBm power. The Applicant has further found that such a high power gain can be efficiently reached by including a pre-amplifier, preferably an erbium-doped pre-amplifier, into the optical amplifying unit.

Furthermore, the Applicant has observed that, for an erbium-ytterbium co-doped fiber, the region of increase in the gain vs. erbium concentration curve is much more extended than for erbium-doped fibers, and has found that, in the 1565–1620 nm band, relatively short active fibers may be used. The Applicant has found that, depending on system parameters such as the signal power at the input of the amplifying unit and the erbium concentration in the active fiber of the amplifying unit, an optimum fiber length of the active fiber can be chosen to minimize the gain tilt in the considered wavelength band.

Moreover, the Applicant has found that, in the considered high-wavelength band, high pump performances can be obtained using erbium-ytterbium double-clad fiber, taking advantage of the multi-mode pumping mechanism.

The Applicant has further found that the above-described amplifying unit can be advantageously used in a long-haul WDM transmission system to obtain high performances in transmissions in the wavelength region up to 1620 nm. In particular, the Applicant has found that a wide-band long-haul WDM transmission system can be realized by subdividing the wavelength transmission band in three sub-bands corresponding to 1529–1535 nm, 1541–1561 nm and 1575–1602 nm, and amplifying the 1575–1602 sub-band by means of optical amplifying units including at least an Er/Yb co-doped amplifier, preferably combined with an Er-doped pre-amplifier. Such a wide band allows, for example, the efficient transmission of sixty-four channels spaced by 50 GHz.

Moreover, the Applicant has found that, thanks to the high gain achievable by means of Er/Yb co-doped amplifiers in the high-wavelength band, a WDM transmission system in the 1575–1602 nm band may include fiber spans having length greater than or equal to 130 km between subsequent amplification stages.

According to a first aspect, the present invention relates to an optical transmission system including an optical transmitting unit adapted to transmit an optical signal in a transmission wavelength band above 1570 nm, an optical receiving unit to receive said optical signal, an optical fiber link optically coupling said transmitting unit to said receiving unit and an optical amplifying unit coupled along said link, said optical amplifying unit having an amplification wavelength band including said transmission wavelength band and comprising an input for the input of said optical signal from said link, an output for the output of said optical signal into said link and an optical amplifier interposed between said input and said output to amplify said optical signal, said optical amplifier including an amplification fiber, a pump source for generating pump radiation and an optical coupler for optically coupling said pump source and said amplification fiber, characterized in that said amplification fiber includes an optical fiber co-doped with erbium and ytterbium.

In particular, said optical amplifying unit has a power gain greater than 29 dB when said optical signal has an input power of at least −10.5 dBm and wavelength within said amplification wavelength band. Preferably, said optical amplifying unit has a power gain of at least 31 dB when said optical signal has an input power of at least −10.5 dBm and wavelength within said amplification wavelength band. More preferably, said optical amplifying unit has a power gain of at least 33 dB when said optical signal has an input power of at least −10.5 dBm and wavelength within said amplification wavelength band.

Preferably, the width of said amplification wavelength band is at least 15 nm and more preferably at least 27 nm.

Preferably, said lower wavelength limit of said amplification wavelength band is greater than or equal to 1575 nm.

Preferably, said optical amplifying unit has a gain variation lower than 1 dB within said amplification wavelength band.

Preferably, said optical transmission system further includes an optical pre-amplifier interposed between said input of said optical amplifying unit and said optical amplifier to pre-amplify said optical signal.

Preferably, said amplification fiber has a core having a concentration of erbium between approximately 600 ppm and 1000 ppm.

Preferably, said amplification fiber has a core having a ratio between ytterbium and erbium concentrations between approximately 5:1 and 30:1.

Preferably, said amplification fiber has a length lower than 30 m and more preferably lower than 13 m.

Preferably, said amplification fiber is a double-clad fiber having a core, an inner cladding surrounding the core and an outer cladding surrounding said inner cladding.

Preferably said optical link includes optical fiber spans having a length of at least 130 km.

In a second aspect, the invention relates to a method for transmitting optical signals, comprising:

generating an optical signal having a wavelength in a wavelength band, said wavelength band having a lower limit greater than 1570 nm;
feeding said signal to an optical link;
amplifying said signal along said optical link;
receiving said optical signal from said optical link;
characterized in that said step of amplifying comprises feeding said signal into an active fiber co-doped with erbium and ytterbium.

Preferably, said step of feeding comprises feeding said signal into one end of said active fiber, said active fiber having a length, an erbium concentration and an ytterbium concentration such that the power gain of said optical signal at the opposite end of said active fiber is at least 25 dB.

More preferably, said step of feeding comprises feeding said signal into one end of said active fiber, said active fiber having a length, an erbium concentration and an ytterbium concentration such that the power gain of said optical signal at the opposite end said active fiber is at least 31 dB.

Preferably, said wavelength band has a width of at least 27 nm.

In a further aspect, the invention relates to an optical amplifying unit for amplifying optical signals in an optical transmission system, said optical amplifying unit having an amplification wavelength band with a lower wavelength limit greater than 1570 nm and with a width of at least 15 nm, and including an amplification fiber, a pump source for generating pump radiation and an optical coupler for optically coupling said pump source to said amplification fiber, characterized in that said amplification fiber includes an optical fiber co-doped with erbium and ytterbium.

The foregoing general description and the following detailed description are exemplary and explanatory only and are not restrictive of the invention as claimed. The following description, as well as the practice of the invention, set forth and suggest additional advantages and purposes of this invention.

The accompanying drawings, which are incorporated in and constitute a part of this specification, illustrate embodiments of the invention, and together with the description, explain the advantages and principles of the invention.

Figure 1:
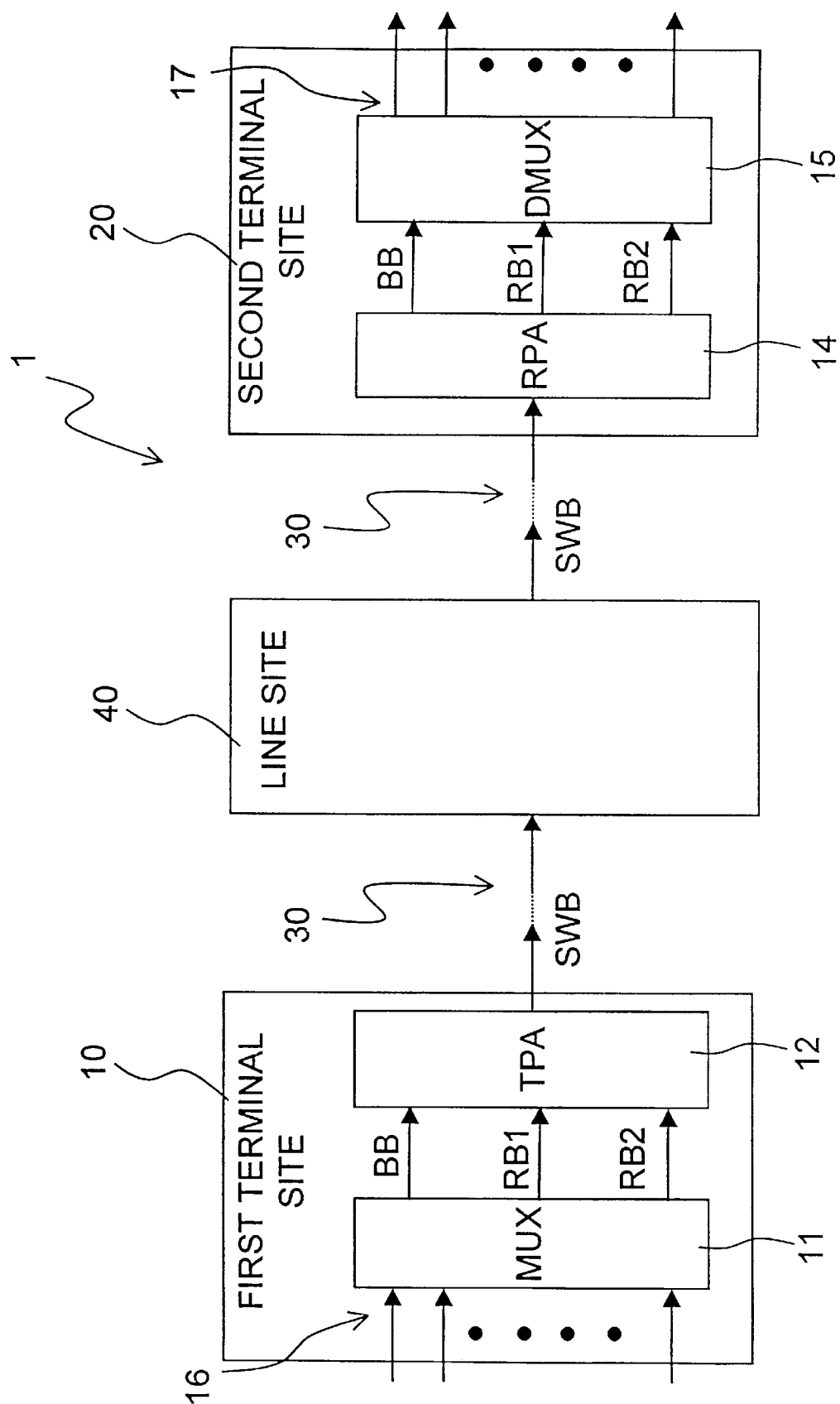
FIG. 1 is a block diagram of an optical transmission system consistent with the present invention.

Referring to FIG. 1, an optical transmission system 1 includes a first terminal site 10, a second terminal site 20, an optical fiber line 30 connecting the two terminal sites 10, 20, and at least one line site 40 interposed between the terminal sites 10 and 20 along the optical fiber line 30.

For simplicity, the optical transmission system 1 hereinafter described is unidirectional, that is signals travel from a terminal site to the other (in the present case from the first terminal site to the second terminal site), but any consideration that follow is to be considered valid also for bi-directional systems, in which signals travel in both directions. Further, although the optical transmission system 1 is adapted to transmit up to one-hundred-twenty-eight (128) channels, from the hereinafter description it will be obvious that the number of channels is not a limiting feature for the scope and the spirit of the invention, and more than one-hundred-twenty-eight (128) channels can be used depending on the needs and requirements of the particular optical transmission system.

The first terminal site 10 preferably includes a multiplexing section (MUX) 11, a transmitter power amplifier section (TPA) 12 and a plurality of input channels 16. The second terminal site 20 preferably includes a receiver pre-amplifier (RPA) section 14, a demultiplexing section (DMUX) 15 and a plurality of output channels 17.

Each input channel 16 is received by multiplexing section 11. Multiplexing section 11, hereinafter described with reference to FIG. 3, multiplexes or groups input channels 16 preferably into three sub-bands, referred to as blue-band BB, first red-band RB1 and second red-band RB2, although multiplexing section 11 could alternatively group input channels 16 into a number of sub-bands greater or less than three.

The three sub-bands BB, RB1 and RB2 are then received, as separate sub-bands or as a combined wide-band, in succession by TPA section 12, at least one line site 40 and second terminal site 20. Sections of optical fiber line 30 adjoin the at least one line site 40 with TPA section 12, RPA section 14, and possibly with others line sites 40 (not shown). TPA section 12, that will be later described with reference to FIG. 4, receives the separate sub-bands BB, RB1 and RB2 from multiplexing section 11, amplifies and optimizes them, and then combines them into a single wide-band SWB for transmission on a first section of optical fiber line 30. Line site 40, that will be later described with reference to FIG. 6, receives the single wide-band SWB, re-divides the single wide-band SWB into the three sub-bands BB, RB1 and RB2, eventually adds and drops signals in each sub-band BB, RB1 and RB2, amplifies and optimizes the three sub-bands BB, RB1 and RB2 and then recombines them into the single wide-band SWB. For the adding and dropping operations, line site 40 may be provided with Optical Add/Drop Multiplexers (OADM) of a known type.

A second section of optical fiber line 30 couples the output of the line site 40 to either another line site 40 (not shown) or to RPA section 14 of second terminal site 20. RPA section 14, that will be later described with reference to FIG. 7, also amplifies and optimizes the single wide-band SWB and may split the single wide-band SWB into the three sub-bands BB, RB1 and RB2 before outputting them.

Figure 8:
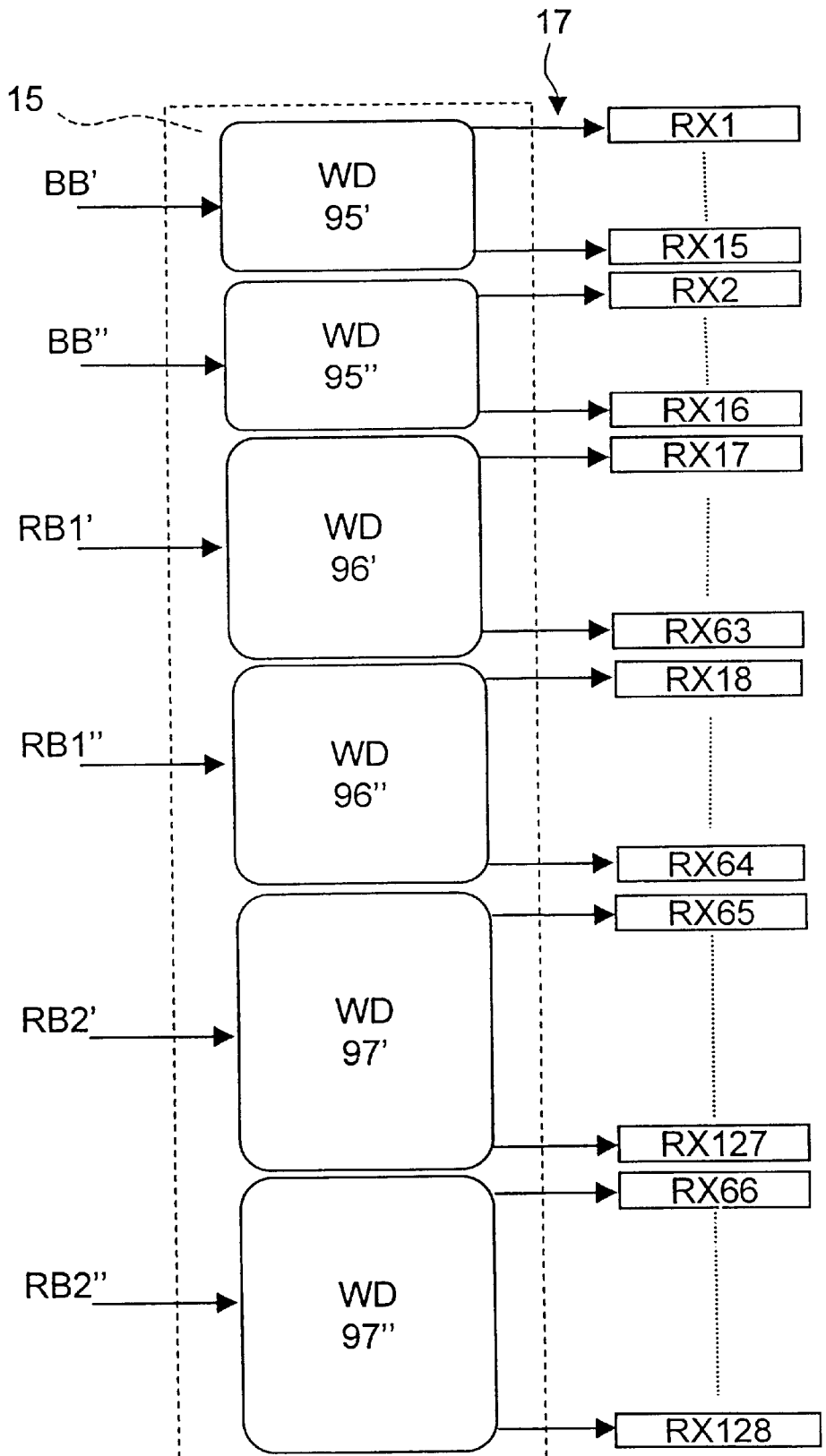
FIG. 8 is a detailed diagram of a demultiplexing section of the optical transmission system of FIG. 1.

Demultiplexing section 15, that will be later described with reference to FIG. 8, receives the three sub-bands BB, RB1 and RB2 from RPA section 14 and splits the three sub-bands BB, RB1 and RB2 into the individual wavelengths of output channels 17. The number of input channels 16 and output channels 17 may be unequal, owing to the fact that some channels can be dropped and/or added in line site (or line sites) 40.

According to the above, for each sub-band BB, RB1 and RB2 an optical link is defined between the corresponding input of TPA section 12 and the corresponding output of RPA section 14.

Figure 2:
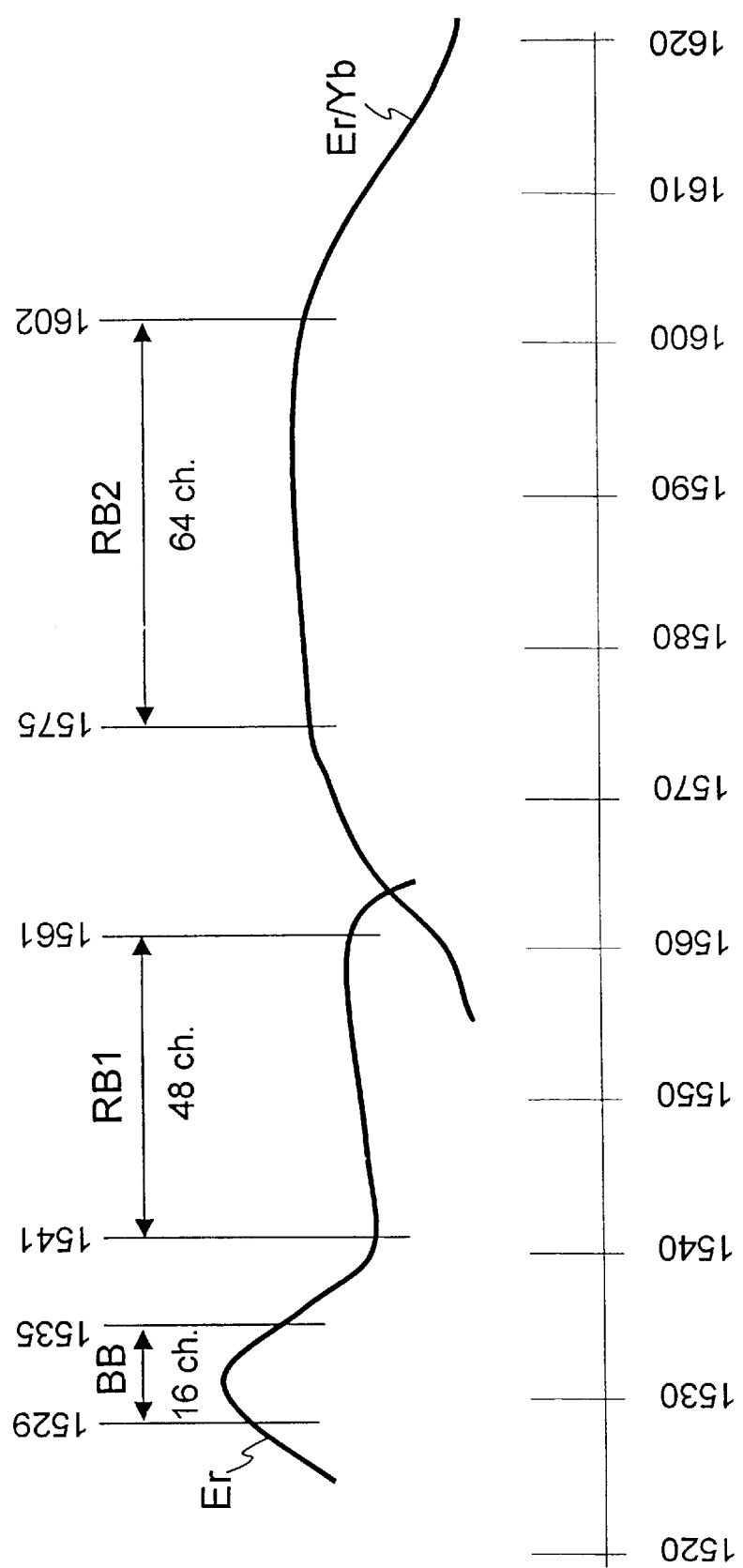
FIG. 2 is a qualitative graph of the spectral gain characteristic of the optical transmission system of FIG. 1, with a designation of the signal transmission bands (BB, RB1 and RB2)

FIG. 2 is a qualitative graph of the spectral emission ranges of the amplifiers used in the optical transmission system 1 approximately corresponding to the different gain for channels of signals traveling through the fiber link and the different allocation of the three sub-bands BB, RB1 and RB2. In particular, the first sub-band BB preferably covers the range between 1529 nm and 1535 nm, corresponding to a first amplification wavelength range of erbium-doped fiber amplifiers, and allocates up to sixteen (16) channels; the second sub-band RB1 fall between 1541 nm and 1561 nm, corresponding to a second amplification wavelength range of erbium-doped fiber amplifiers, and allocates up to forty-eight (48) channels; and the third sub-band RB2 covers the range between 1575 nm and 1602 nm, corresponding, according to the invention, to an amplification wavelength range of erbium/ytterbium-doped fiber amplifiers, and allocates up to sixty-four (64) channels. The gain spectral graph of the erbium/ytterbium-doped fiber amplifiers is such that, although the 1575–1602 nm range offers the best performances in terms of amplification, channels can be advantageously allocated down to 1565 nm and up to 1620 nm. More in details, the Applicant has observed that a lower limit 1570 nm is preferred for the allocation of channels in the RB2 band, due to the shape of the power spectrum curve of Er/Yb co-doped fibers in this wavelength range.

Adjacent channels, in the proposed one-hundred-twenty-eight (128) channel system, have a 50 GHz constant spacing. Alternatively, the frequency spacing may be unequal to alleviate the known four-wave-mixing phenomenon.

In the erbium amplification band, the RB1 and RB2 bands have a fairly flat gain characteristic, while the BB band includes a substantial hump in the gain response. As explained below, to make use of the erbium-doped fiber spectral emission range in the BB band, optical transmission system 1 uses equalizing means to flatten the gain characteristic in that range. As a result, by dividing the erbium-doped fiber spectral emission range of 1529–1602 nm into three sub-ranges that respectively include the BB band, RB1 band and RB2 band, optical transmission system 1 can effectively use most of the erbium-doped fiber spectral emission range and provide for dense WDM.

The following provides a more detailed description of the various modules of the present invention depicted in FIG. 1.

Figure 3:
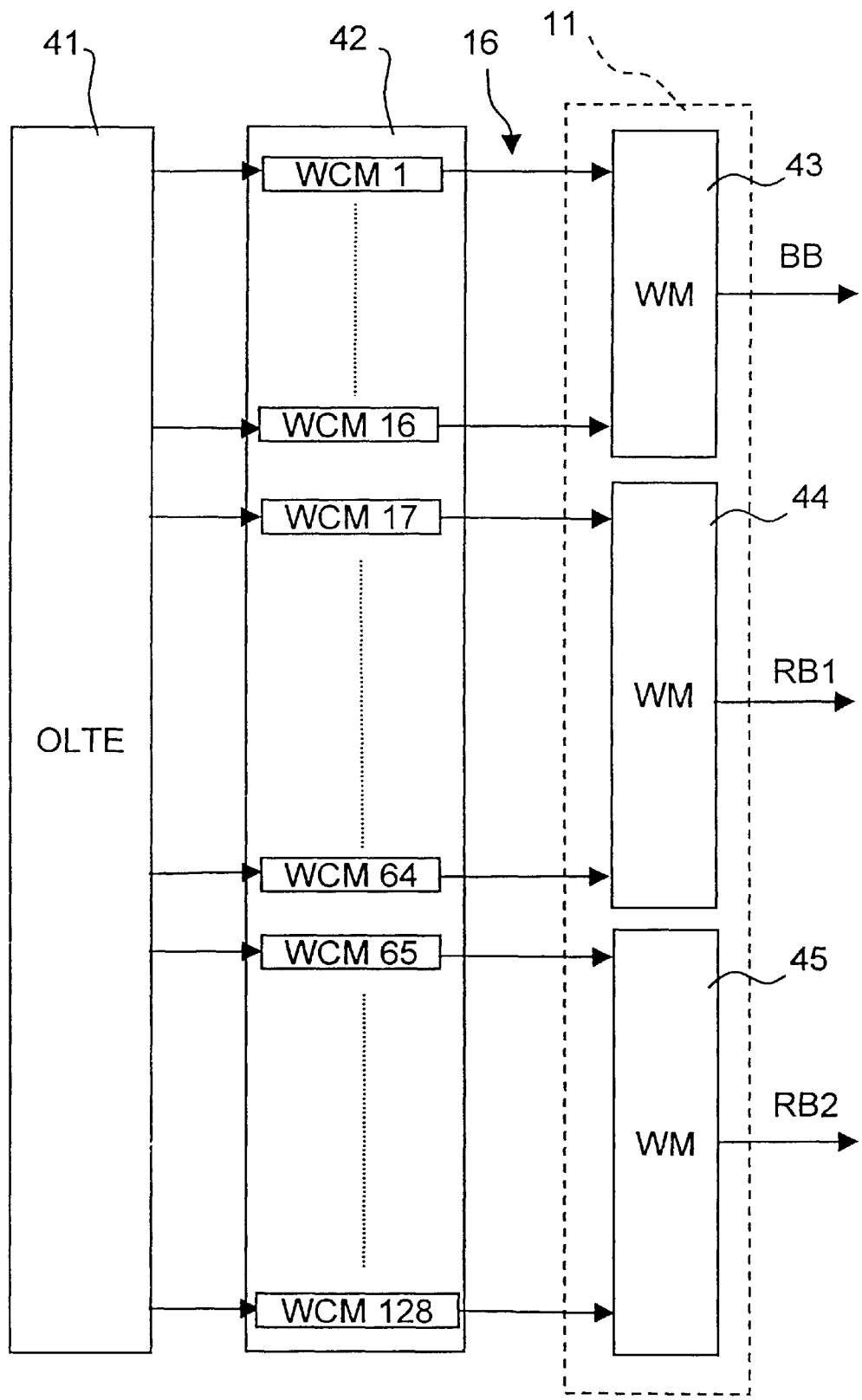
FIG. 3 is a more detailed diagram of the multiplexing section of the optical transmission system in FIG. 1.

FIG. 3 shows a more detailed diagram of the multiplexing section 11 of first terminal site 10. The first terminal site 10 includes, in addition to the multiplexing section 11 and the TPA section 12 (not shown in FIG. 3), an optical line terminal section (OLTE) 41 and a wavelength converter section (WCS) 42.

OLTE 41, which may correspond to standard line terminating equipment for use in a SONET, ATM, IP or SDH system, includes transmit/receive (TX/RX) units (not shown) in a quantity that equals the number of channels in WDM systems 10. In a preferred embodiment, OLTE 41 has one-hundred-twenty-eight (128) TX/RX units. In multiplexing section 11, OLTE 41 transmits a plurality of signals at a generic wavelength. As shown in FIG. 3, in a preferred embodiment OLTE 41 outputs a first group of sixteen (16) channels, a second group of forty-eight (48) channels and a third group of sixty-four (64) channels. However, as indicated above, the number of channels may vary depending on the needs and requirements of the particular optical transmission system.

As readily understood to one of ordinary skill in the art, OLTE 41 may comprise a collection of smaller separate OLTEs, such as three, that feed information frequencies to WCS 42. Accordingly, WCS 42 includes one-hundred-twenty-eight (128) wavelength converter modules WCM1–WCM128.

Units WCM1–WCM16 each receive a respective one of the first group of signals emitted from OLTE 41, units WCM17–WCM64 each receive one of the second group of signals emitted from OLTE 41 and units WCM65–WCM128 each receive one of the third group of signals emitted from OLTE 41. Each unit is able to convert a signal from a generic wavelength to a selected wavelength and re-transmit the signal. The units may receive and re-transmit a signal in a standard format, such as OC-48 or STM-16, but the preferred operation of WCM1–128 is transparent to the particular data format employed.

Each WCM1–128 preferably comprises a module having a photodiode (not shown) for receiving an optical signal from OLTE 41 and converting it to an electrical signal, a laser or optical source (not shown) for generating a fixed carrier wavelength, and an electro-optic modulator such as a Mach-Zehnder modulator (not shown) for externally modulating the fixed carrier wavelength with the electrical signal. Alternatively, each WCM1–128 may comprise a photodiode (not shown) together with a laser diode (not shown) that is directly modulated with the electrical signal to convert the received wavelength to the carrier wavelength of the laser diode. As a further alternative, each WCM1–128 comprises a module having a high sensitivity receiver (e.g., according to SDH or SONET standards) for receiving an optical signal, e.g., via a wavelength demultiplexer, from a trunk fiber line end and converting it to an electrical signal, and a direct modulation or external modulation laser source. By the latter alternative, regeneration of signals from the output of a trunk fiber line and transmission in the inventive optical communication system is made possible, which allows extending the total link length.

Although FIG. 3 shows that the signals are provided and generated by the combination of OLTE 41 and WCM1–WCM128, the signals can also be directly provided and generated by a source without limitation to their origin.

The multiplexing section 11 includes three wavelength multiplexers (WM) 43, 44 and 45. For the preferred one-hundred-twenty-eight (128) channels system, each selected wavelength signal output from units WCM1–WCM16 is received by WM 43, each selected wavelength signal output from WCM17–WCM64 is received by WM 44 and each selected wavelength signal output from WCM65–WCM128 is received by WM 45. WM 43, WM 44 and WM 45 combine the received signals of the three bands BB, RB1 and RB2 into three respective wavelength division multiplexed signals. As shown in FIG. 3, WM 43 is a sixteen (16) channels wavelength multiplexer, such as a conventional 1×16 planar optical splitter, WM 44 is a forty-eight (48) channels wavelength multiplexer, such as a conventional 1×64 planar optical splitter with sixteen (16) unused ports and WM 45 is a sixty-four (64) channels wavelength multiplexer, such as a conventional 1×64 planar optical splitter. Each wavelength multiplexer may include a second port (e.g. 2×16 and 2×64 splitters) for providing optical transmission system 1 with an optical monitoring channel (not shown). As well, WM 43, 44 and 45 may have more inputs than is used by the system to provide space for system growth. A wavelength multiplexer using passive silica-on-silicon ($SiO_2$—$Si$) or silica-on-silica ($SiO_2$—$SiO_2$) technology, for instance, can be made by one of ordinary skill in the art. Other technologies can also be used for WMs, e.g., for reducing insertion losses. Examples are AWG (Arrayed Waveguide Gratings), fiber gratings, and interferential filters.

Figure 4:
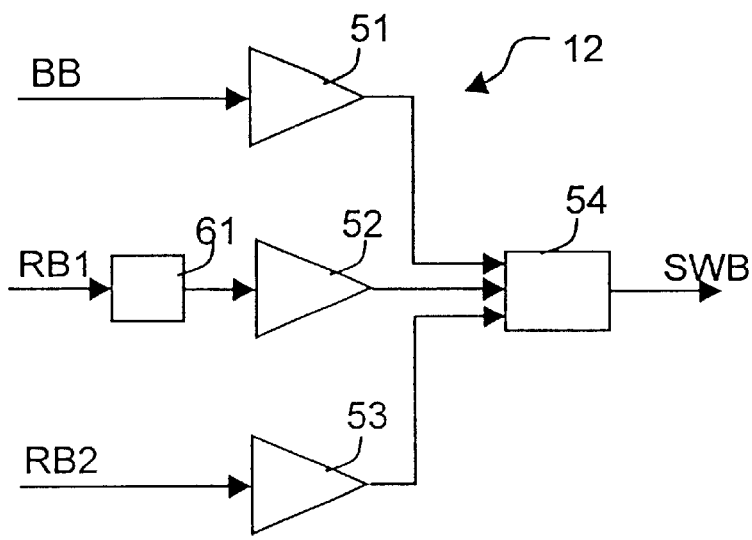
FIG. 4 is a more detailed diagram of the transmitter power amplifier section of the optical transmission system in FIG. 1.

With reference to FIG. 4, the BB, RB1 and RB2 band output from multiplexing section 11 are received by TPA section 12. The BB, RB1 and RB2 band signals may be provided to TPA section 12 from a source other than the OLTE 41, WCS 42, and WM 43, 44 and 45 configuration depicted in FIG. 3. For example, the BB, RB1 and RB2 band signals may be generated and directly supplied to TPA section 12 by a customer without departing from the intent of the present invention described in more detail below.

TPA section 12 includes three amplifier sections 51, 52, 53, each for a respective band BB, RB1 and RB2, a coupling filter 54 and an equalizing filter 61. Amplifier sections 51, 52 are preferably erbium-doped two-stages fiber amplifiers (although other rare-earth-doped fiber amplifiers may be used), while amplifier section 53 is, according to the invention, an erbium/ytterbium-doped (Er/Yb) fiber amplifier that will be described in details with reference to FIGS. 9, 15 and 16.

The outputs of amplifiers 51, 52 and 53 are received by filter 54, which combines the BB, RB1 and RB2 bands into a single wide-band (SWB).

Each of the amplifiers 51 and 52 is pumped by one or two laser diodes to provide optical gain to the signals it amplifies. The characteristics of each amplifier, including its length and pump wavelength, are selected to optimize the performance of that amplifier for the particular sub-band that it amplifies. For example, the first stage of amplifier sections 51 and 52 may be pumped with a laser diode (not shown) operating at 980 nm to amplify the BB band and the RB1 band, respectively, in a linear or in a saturated regime. Appropriate laser diodes are available from the Applicant. The laser diodes may be coupled to the optical path of the pre-amplifiers using 980/1550 WDM couplers (not shown) commonly available on the market, for example model SWDM0915SPR from E-TEK DYNAMICS, INC., 1885 Lundy Ave., San Jose, Calif. (USA). The 980 nm laser diode provides a low noise figure for the amplifiers compared with other possible pump wavelengths.

The second stage of each amplifier section 51–53 preferably operates in a saturated condition. The second stage of amplifier section 51 is preferably erbium-doped and amplifies the BB band with another 980 nm pump (not shown) coupled to the optical path of the BB band using a WDM coupler (not shown) described above. The 980 nm pump provides better gain behavior and noise figure for signals in the low band region that covers 1529–35 nm. The second stage of amplifier section 52 is preferably erbium-doped and amplifies the RB1 band with a laser diode pump source operating at 1480 nm. Such a laser diode is available on the market, such as model FOL1402PAX-1 supplied by JDS FITEL, INC., 570 Heston Drive, Nepean, Ontario (Calif.). The 1480 nm pump provides better saturated conversion efficiency behavior, which is needed in the RB1 band for the greater number of channels in the region that covers 1542–61 nm. Alternatively, a higher power 980 nm pump laser or multiplexed 980 nm pump sources may be used. Section 53 will be hereunder described in details with reference to FIGS. 9, 15 and 16.

Figure 5:
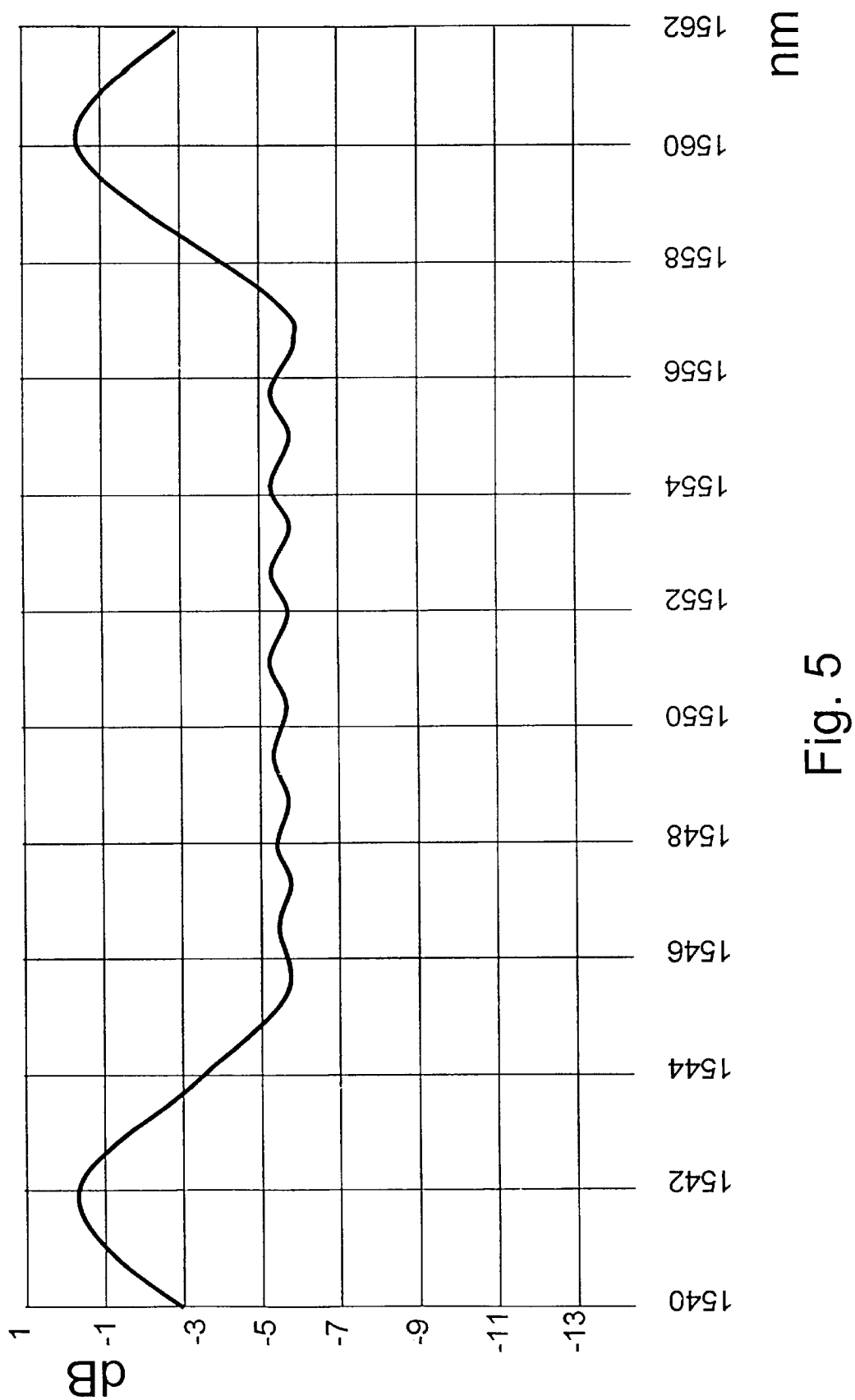
FIG. 5 is a graph of a filter performance shape of a de-emphasis filter for the transmitter power amplifier of the present invention.

Filter 61 is positioned within the RB1 band amplifier chain for helping to equalize signal levels and SNRs at the system output across the RB1 band. In particular, filter 61 comprises a de-emphasis filter that attenuates the wavelength regions of the high amplification within the RB1 band. The de-emphasis filter, if used, may employ long period Bragg grating technology, split-beam Fourier filter, etc. As an example, the de-emphasis filter may have an operating wavelength range of 1541–1561 nm and have wavelengths of peak transmission at 1541–1542 nm and 1559–1560 nm, with a lower, relatively constant transmission for the wavelengths between these peaks. FIG. 5 illustrates the filter shape or relative attenuation performance of a preferred de-emphasis filter 61. The graph of FIG. 5 shows that the de-emphasis filter 61 has regions of peak transmission at around 1542 nm and 1560 nm, and a region of relatively constant or flat attenuation between about 1546 nm and 1556 nm. The de-emphasis filter 61 for erbium-doped fiber amplifiers need only add an attenuation of about 3–4 dB at wavelengths between the peaks to help flatten the gain response across the high band. The de-emphasis filter 61 may have an attenuation characteristic different from that depicted in FIG. 5 depending on the gain-flattening requirements of the actual system employed, such as the dopant used in the fiber amplifiers or the wavelength of the pump source for those amplifiers.

Alternatively, the de-emphasis filter 61 may be omitted and the de-emphasis operation may be obtained in the multiplexing section 11 of the first terminal site 10 by means of calibrated attenuation.

After passing through the amplifiers of TPA 12, the amplified BB, RB1 and RB2 bands output from amplifier sections 51, 52 and 53, respectively, are received by filter 54. Filter 54 is a band combining filter and may, for example, include two cascaded interferential three port filters (not shown), the first coupling the BB band with the RB1 band and the second coupling the BB/RB1 bands provided by the first filter with the RB2 band.

An optical monitor (not shown) and insertion for a service line, at a wavelength different from the communication channels, e.g. at 1480 nm, through a WDM 1480/1550 interferential filter (not shown) may also be added at the common port. The optical monitor detects optical signals to ensure that there is no break in optical transmission system 1. The service line insertion provides access for a line service module, which can manage through an optical supervisory channel the telemetry of alarms, surveillance, monitoring of performance and data, controls and housekeeping alarms, and voice frequency orderwire.

Figure 6:
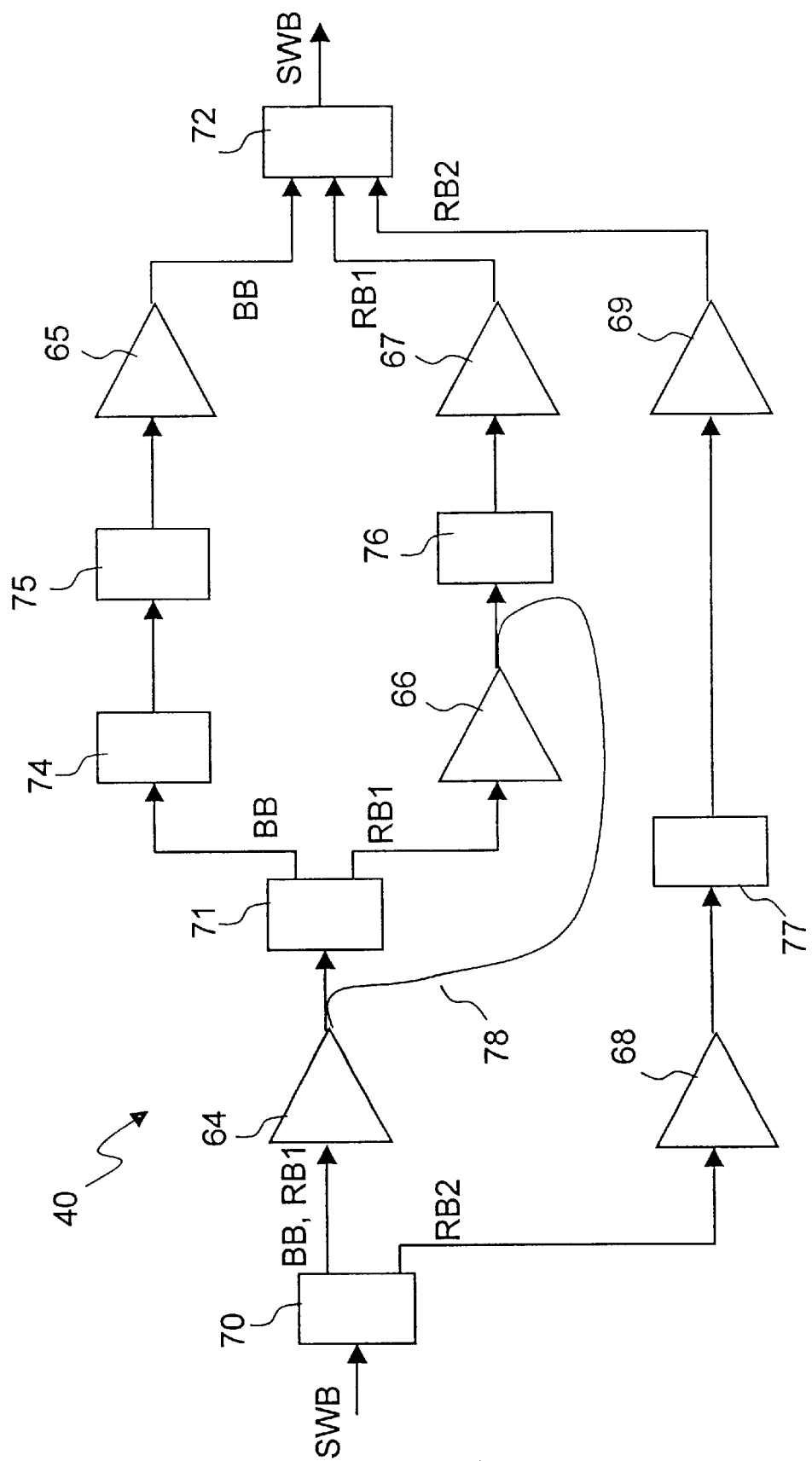
FIG. 6 is a detailed diagram of an intermediate station of the optical transmission system of FIG. 1.

The single wide-band output from filter 54 of TPA section 12 passes through a length of transmission fiber (not shown) of optical fiber line 30 such as 100 kilometers, which attenuates the signals within the single wide-band SWB. Consequently, line site 40 receives and amplifies the signals within the single wide-band SWB. As shown in FIG. 6, line site 40 includes several amplifiers (AMP) 64–69, three filters 70–72, an equalizing filter (EQ) 74 and three OADM stages 75–77.

Filter 70 receives the single wide-band SWB and separates the RB2 band from the BB and the RB1 bands. Amplifier 64 receives and amplifies the BB and the RB1 bands, whereas filter 71 receives the output from amplifier 64 and separates the BB band and the RB1 band. The BB band is equalized by equalizing filter 74, received by the first OADM stage 75 where predetermined signals are dropped and/or added, and further amplified by amplifier 65. The RB1 band, which has already passed through de-emphasis filter 61 in TPA 12, is first amplified by amplifiers 66, then received by the second OADM stage 76 where predetermined signals are dropped and/or added, and further amplified by amplifier 67. The RB2 band is first amplified by amplifiers 68, then received by the third OADM stage 77 where predetermined signals are dropped and/or added, and further amplified by amplifier 69. The amplified BB, RB1 and RB2 bands are then recombined into the single wide-band SWB by filter 72.

Amplifier 64, which receives the single wide-band SWB, preferably comprises a single optical fiber amplifier that is operated in a linear regime. That is, amplifier 64 is operated in a condition where its output power is dependent on its input power. Depending on the actual implementation, amplifier 64 may alternatively be a single-stage or a multi-stage amplifier. By operating it in a linear condition, amplifier 64 helps to ensure relative power independence between the BB and RB1 band channels. In other words, with amplifier 64 operating in a linear condition, the output power (and signal-to-noise ratio) of individual channels in the one of the two sub-bands BB, RB1 does not vary significantly if channels in the other sub-band RB1, BB are added or removed. To obtain robustness with respect to the presence of some or all of the channels in a dense WDM system, first stage amplifier (such as amplifier 64 and amplifier 68) must be operated, in a line site 40, in an unsaturated regime, before extracting a portion of the channels for separate equalization and amplification. In a preferred embodiment, amplifiers 64 and 68 are erbium-doped fiber amplifiers, pumped in a co-propagating direction with a laser diode (not shown) operating at 980 nm pump to obtain a noise figure preferably less than 5.5 dB for each band.

Filter 71 may comprise, for example, a three-port device, preferably an interferential filter, having a drop port that feeds the BB band into equalizing filter 74 and a reflection port that feeds the RB1 band into amplifier 66.

Amplifier 66 is preferably a single erbium-doped fiber amplifier that is operated in saturation, such that its output power is substantially independent from its input power. In this way, amplifier 66 serves to add a power boost to the channels in the RB1 band compared with the channels in the BB band. Due to the greater number of channels in the RB1 band compared with the BB band in the preferred embodiment, i.e. forty-eight (48) channels as opposed to sixteen (16), the RB1 band channels typically will have had a lower gain when passing through amplifier 64. As a result, amplifier 66 helps to balance the power for the channels in the RB1 band compared with the BB band. Of course, for other arrangements of channels between the BB and the RB1 bands, amplifier 66 may not be required or may alternatively be required on the BB band side of line site 40.

With respect to the RB1 band of channels, amplifiers 64 and 66 may be viewed together as a two-stage amplifier with the first stage operated in a linear mode and the second stage operated in saturation. To help stabilize the output power between channels in the RB1 band, amplifier 64 and 66 are preferably pumped with the same laser diode pump source. In this manner, as described in EP 695049, the residual pump power from amplifier 64 is provided to amplifier 66. Specifically, line site 40 includes a WDM coupler positioned between amplifier 64 and filter 71 that extracts 980 nm pump light that remains at the output of amplifier 64. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler (not shown) of the same type and positioned in the optical path after amplifier 66. The two couplers are joined by an optical fiber 78 that transmits the residual 980 nm pump signal with relatively low loss. The second WDM coupler passes the residual 980 nm pump power into amplifier 66 in a counter-propagating direction.

From amplifier 66, RB1 band signals are conveyed to OADM stage 76, for example an OADM of a known type. From OADM stage 76, RB1 band signals are fed to amplifier 67. For the preferred erbium-doped fiber amplifier, amplifier 67 has a pump wavelength of, for example, 1480 nm from a laser diode source (not shown) having a pump power in excess of the laser (not shown) that drives amplifiers 64 and 66. The 1480 nm wavelength provides good conversion efficiency for high output power output compared with other pump wavelengths for erbium-doped fibers. Alternatively, a high power 980 nm pump source or a group of multiplexed pump sources, such as two pump sources at 980 nm, or one at 975 nm and another at 986 nm, could be used to drive amplifier 67. Amplifier 67 preferably operates in saturation to provide the power boost to the signals within the RB1 band, and if desired, may comprise a multi-stage amplifier.

After passing through amplifier 64 and filter 71, the BB band enters equalizing filter 74. As discussed above, the gain characteristic for the erbium-doped fiber spectral emission range has a peak or hump in the BB band region, but remains fairly flat in the RB1 band region. As a result, when the BB band or the single wide-band SWB (which includes the BB band) is amplified by an erbium-doped fiber amplifier, the channels in the BB band region are amplified unequally. Also, as discussed above, when equalizing means have been applied to overcome this problem of unequal amplification, the equalizing has been applied across the entire spectrum of channels, resulting in continued gain disparities. However, by splitting the spectrum of channels into a BB band and a RB1 band, equalization in the reduced operating area of the BB band can provide proper flattening of the gain characteristic for the channels of the BB band.

In a preferred embodiment, the equalizing filter 74 comprises a two-port device based on long period chirped Bragg grating technology that gives selected attenuation at different wavelengths. For instance, equalizing filter 74 for the BB band may have an operating wavelength range of 1529 nm to 1536 nm, with a wavelength at the bottom of the valley at between 1530.3 nm and 1530.7 nm. Equalizing filter 74 need not be used alone and may be combined in cascade with other filters (not shown) to provide an optimal filter shape, and thus, gain equalization for the particular amplifiers used in the WDM system 1. Equalizing filter 74 may be manufactured by one skilled in the art, or may be obtained from numerous suppliers in the field. It is to be understood that the particular structure used for the equalizing filter 74 is within the realm of the skilled artisan and may include, for instance, a specialized Bragg grating like a long period grating, an interferential filter, or Mach-Zehnder type optical filters.

From equalizing filter 74, BB band signals are conveyed to OADM stage 75, which is, for example, of the same type of OADM stage 76, and then to amplifier 65. With the preferred erbium-doped fiber amplifier, amplifier 65 has a pump wavelength of 980 nm, provided by a laser diode source (not shown) and coupled via a WDM coupler (not shown) to the optical path for pumping the amplifier 65 in a counter-propagating direction. Since the channels in the BB band pass through both amplifier 64 and amplifier 65, equalizing filter 74 may compensate for the gain disparities caused by both amplifiers. Thus, the decibel drop for equalizing filter 74 should be determined according to the overall amplification and line power requirements for the BB band. The amplifier 65 preferably operates in saturation to provide a power boost to the signals in the BB band, and may comprise a multi-stage amplifier if desired.

The RB2 band is received from fiber amplifier 68, which is, preferably, an erbium doped fiber amplifier pumped with a 980 nm or a 1480 nm pump light, depending on the system requirements. From amplifier 68, RB2 band channels are conveyed to OADM stage 77, which is, for example, of the same type of OADM stages 75 and 76, and then fed to amplifier 69. Amplifier 69 is, according to the invention, an erbium/ytterbium co-doped amplifier adapted to amplify the RB2 band and will be described in details with reference to FIGS. 9, 15, 16.

After passing through amplifiers 65, 67 and 69 respectively, the amplified BB, RB1 and RB2 bands are then recombined by filter 72 into the single wide-band SWB. Like filter 54 of FIG. 4, filter 72 may, for example, include two cascaded interferential three port filter (not shown), the first coupling the BB with the RB1 bands and the second coupling the BB and RB1 bands provided by the first filter with the RB2 band.

Like TPA section 12, line site 40 may also include an optical monitor and a service line insertion and extraction (not shown) through, e.g., a WDM 1480/1550 interferential filter (not shown). One or more of these elements may be included at any of the interconnection points of line site 40.

Besides amplifiers 64–69, filters 70–72 and 74, and OADM stages 75–77, line site 40 may also include a dispersion compensating module (DCM) (not shown) for compensating for chromatic dispersion that may arise during transmission of the signals along the long-distance communication link. The DCM (not shown) is preferably comprised of sub-units coupled upstream one or more of amplifiers 65, 67, 69 for compensating the dispersion of channels in the BB, RB1, RB2 bands, and may also have several forms. For example, the DCM may have an optical circulator with a first port connected to receive the channels in one or more than one of the three bands BB, RB1 and RB2. A chirped Bragg grating may be attached to a second port of the circulator. The channels will exit the second port and be reflected in the chirped Bragg grating to compensate for chromatic dispersion. The dispersion compensated signals will then exit a next port of the circulator for continued transmission in the WDM system. Other devices besides the chirped Bragg grating, such as a length of dispersion compensating fiber, may be used for compensating the chromatic dispersion. The design and use of the DCM section are not limiting the present invention and the DCM section may be employed or omitted in the WDM system 1 depending on overall requirements for system implementation.

After the line site 40, the combined single wide-band SWB signal passes through a length of long-distance optical transmission fiber of optical fiber line 30. If the distance between the first and the second terminal site 10, 20 is sufficiently long to cause attenuation of the optical signals, i.e. 100 kilometers or more, one or more additional line sites 40 providing amplification may be used. In a practical arrangement, five spans of long-distance transmission fiber are used (each having a power loss of 0.22 dB/km and a length such as to provide a total span loss of approximately 25 dB), separated by four amplifying line site 40.

Figure 7:
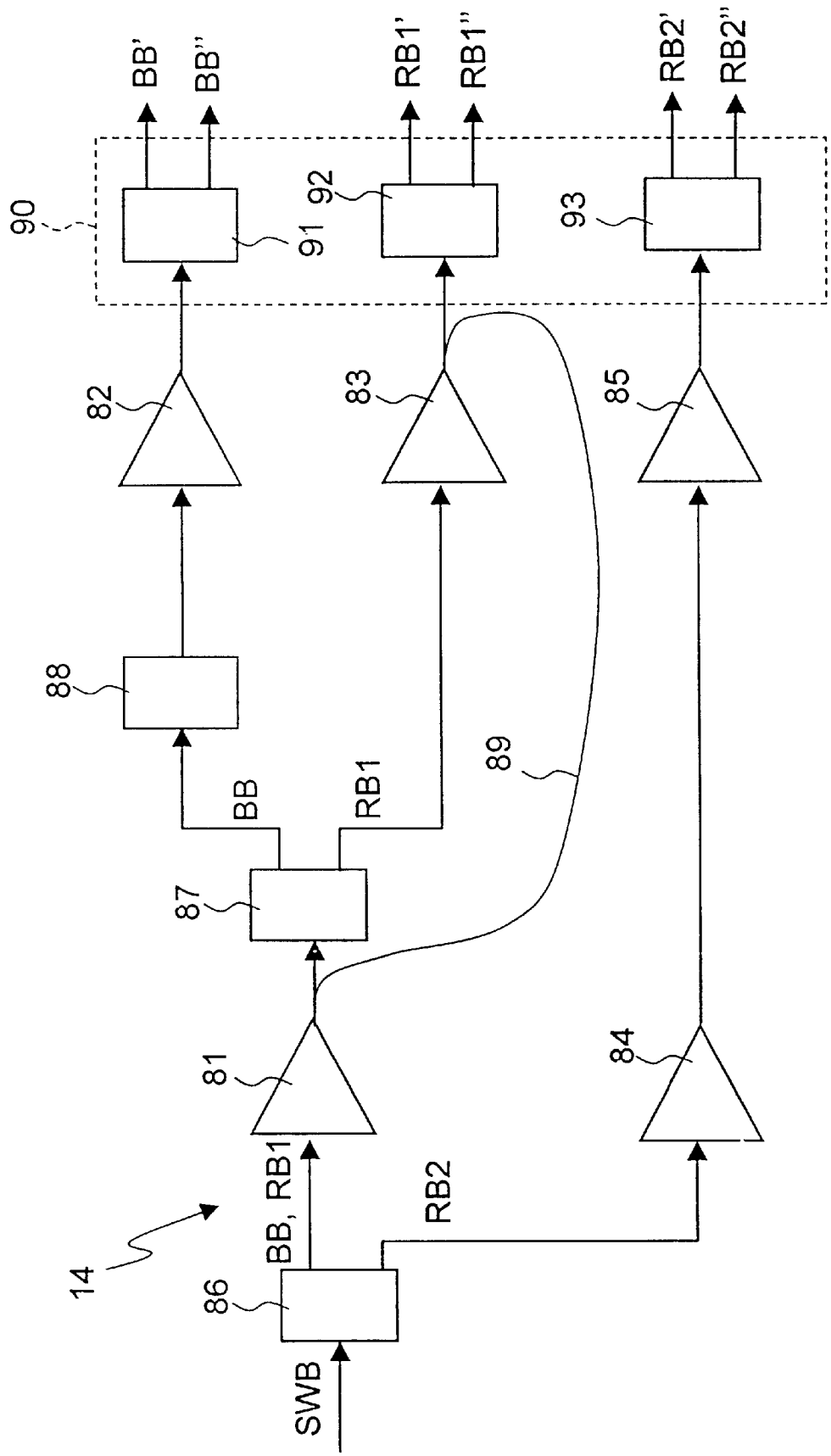
FIG. 7 is a detailed diagram of a receiver pre-amplifier section of the optical transmission system of FIG. 1.

Following the final span of transmission fiber, RPA section 14 receives the single wide-band SWB from last line site 40 and prepares the signals of the single wide-band SWB for reception and detection at the end of the communication link. As shown in FIG. 7, RPA section 14 may include amplifiers (AMP) 81–85, filters 86 and 87, an equalizing filter 88 and, if necessary, three router modules 91–93.

Filter 86 receives the single wide-band SWB and separates the RB2 band from the BB and RB1 bands. Amplifier 81 is preferably doped with erbium and amplifies the BB and RB1 bands to help improve the signal-to-noise ratio for the channels in the BB and RB1 bands. Amplifier 81 is pumped, for example, with a 980 nm pump or with a pump at some other wavelength to provide a low noise figure for the amplifier. The BB and RB1 bands are in turn separated by filter 87.

As with TPA section 12 and line site 40, amplifier 82 and 83 amplify the BB band and, respectively, the RB1 band, with a 980 nm pumping. To help stabilize the output power between channels in the RB1 band, amplifier 81 and 83 are preferably pumped with the same 980 nm laser diode pump source, by using a joining optical fiber 89 that transmits the residual 980 nm pump signal with relatively low loss. Specifically, amplifier 81 is associated with a WDM coupler, positioned between amplifier 81 and filter 87, that extracts the 980 nm pump light that remains at the output of amplifier 81. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler of the same type and positioned in the optical path after amplifier 83. The two couplers are joined by an optical fiber 89 that transmits the residual 980 nm pump signal with relatively low loss. The second WDM coupler passes the residual 980 nm pump power into amplifier 83 in a counter-propagating direction. Thus, amplifiers 81–83, filter 87 and equalizing filter 88 perform the same functions as amplifiers 64, 65 and 67, filter 71, and equalizing filter 74, respectively, of line site 40 and may comprise the same or equivalent parts depending on overall system requirements.

Amplifier 84 is coupled to filter 86 to receive and amplify the RB2 band. Amplifier 84 is, for example, an erbium-doped amplifier identical to the amplifier 68 of FIG. 6. RB2 band channels are then received by amplifier 85 that is, for example, an erbium-doped amplifier of a known type.

RPA section 14 further comprises a routing stage 90, which permits to adapt the channel spacing within the BB, RB1 and RB2 bands to the channel separation capability of demultiplexing section 15. In particular, if the channel separation capability of demultiplexing section 15 is for a relatively wide channel spacing (e.g. 100 GHz grid) while channels in WDM system 1 are densely spaced (e.g. 50 GHz), then RPA section 14 could include the routing stage 90 shown in FIG. 7. Other structures may be added to RPA section 14 depending on the channel separation capability of demultiplexing section 15.

Routing stage 90 includes three router modules 91–93. Each router module 91–93 separates the respective band into two sub-bands, each sub-band including half of the channels of the corresponding band. For example, if the BB band includes sixteen (16) channels $\lambda_1$–$\lambda_{16}$, each separated by 50 GHz, then router module 91 would split the BB band into a first sub-band BB' having channels $\lambda_1, \lambda_3, \ldots, \lambda_{15}$ separated by 100 GHz and a second sub-band BB'' having channels $\lambda_2, \lambda_4, \ldots, \lambda_{16}$ separated by 100 GHz and interleaved with the channels in the sub-band BB'. In a similar fashion, router modules 92 and 93 would split the RB1 band and the RB2 band, respectively, into first sub-bands RB1' and RB2' and second sub-bands RB1'' and RB2''.

Each router module 91–93 may, for example, include a coupler (not shown) that has a first series of Bragg gratings attached to a first port and a second series of gratings attached to a second port. The Bragg gratings attached to the first port would have reflection wavelengths that correspond to every other channel (i.e. the even channels), while the Bragg gratings attached to the second port would have reflection wavelengths that correspond to the remaining channels (i.e. the odd channels). This arrangement of gratings will also serve to split the single input path into two output paths with twice the channel-to-channel spacing.

After passing through RPA section 14, the BB, RB1 and RB2 bands or their respective sub-bands are received by demultiplexing section 15. As shown in FIG. 8, demultiplexing section 15 includes six wavelength demultiplexers (WDs) 95', 95'', 96', 96'', 97', 97'' which receive the respective sub-bands BB', BB'', RB1', RB1'', RB2' and RB2'' and generate the output channels 17. Demultiplexing section 15 further includes receiving units Rx1–Rx128 for receiving the output channels 17.

The wavelength demultiplexers preferably comprise arrayed waveguide grating devices, but alternate structures for achieving the same or similar wavelength separation are contemplated. For instance, one may use interferential filters, Fabry-Perot filters, or in-fiber Bragg gratings in a conventional manner to demultiplex the channels within the sub-bands BB', BB'', RB1', RB1'', RB2', RB2''.

In a preferred configuration, demultiplexer section 15 combines interferential filter and AWG filter technology. Alternatively, one may use Fabry-Perot filters or in-fiber Bragg gratings. WDs 95', 95'', which are preferably eight channel demultiplexers with interferential filters, receive and demultiplex first sub-band BB' and second sub-band BB'', respectively. Specifically, WD 95' demultiplexes channels $\lambda_1, \lambda_3, \ldots, \lambda_{15}$, and WD 95'' demultiplexes channels $\lambda_2, \lambda_4, \ldots, \lambda_{16}$. Both WD 95' and WD 95'', however, may be 1×8 type AWG 100 GHz demultiplexers. Similarly, WDs 96' and 96'' receive and demultiplex first sub-band RB1' and second sub-band RB1'', respectively, to produce channels $\lambda_{17}$–$\lambda_{64}$ and WDs 97' and 97'' receive and demultiplex first sub-band RB2' and second sub-band RB2'', respectively, to produce channels $\lambda_{65}$–$\lambda_{128}$. Both WD 96' and WD 96'' may be 1×32 type AWG 100 GHz demultiplexers that are underequipped to use only twenty-four of the available demultiplexer ports and both WD 97' and WD 97'' may be 1×32 type AWG 100 GHz demultiplexers that uses all the available demultiplexer ports. Output channels 17 are composed of the individual channels demultiplexed by WDs 95', 95'', 96', 96'', 97', 97'', and each channel of output channels 17 is received by one of receiving units Rx1–Rx128.

Figure 9:
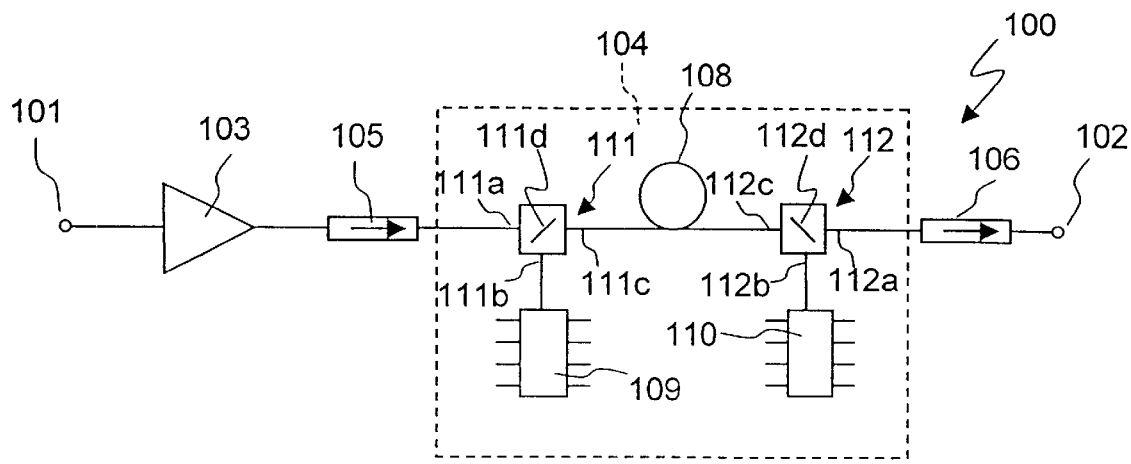
FIG. 9 is a schematic representation of a first embodiment of an optical amplifying unit according to the invention.

FIG. 9 illustrates an erbium/ytterbium fiber amplifying unit 100 adapted, according to the present invention, to be used in the optical transmission system 1 to amplify the RB2 band. In particular, amplifying unit 100 is a preferred embodiment for the amplifier sections 53 of FIG. 4 and 69 of FIG. 6.

Amplifying unit 100 includes an input 101, an output 102, an erbium fiber pre-amplifier 103 and an erbium/ytterbium fiber amplifier 104. Pre-amplifier 103 and amplifier 104 are arranged in series and the pre-amplifier 103 is positioned between input 101 and amplifier 104 for providing a first amplification to RB2 channels received at input 101.

Amplifying unit 100 also preferably comprises a first and second isolator 105, 106. The first isolator 105 is positioned between pre-amplifier 103 and amplifier 104 and is adapted to block light directed from the amplifier 104 towards pre-amplifier 103. The second isolator 106 is positioned between amplifier 104 and output 102 and is adapted to block light directed from output 102 towards optical amplifier 104.

Pre-amplifier 103 may be, for example, a single-stage erbium-doped fiber amplifier of a known type, pumped at 980 nm and/or 1480 nm, depending on the system requirements. The total length of the erbium-doped active fiber in pre-amplifier 103 is preferably between 80 m and 150 m. Pre-amplifier 103 receives the RB2 band from input 101 and amplifies the RB2 channels to a first power level, for example up to 15–17 dBm. The first amplification performed by pre-amplifier 103 allows reaching a high power level at the output of amplifier 104, as will be shown later on. Pre-amplifier 103 also improves the noise figure (NF) of amplifying unit 100 and permits to equalize the RB2 band channels.

Amplifier 104 is a single-stage fiber amplifier with bi-directional pumping, including an amplification optical fiber 108 having a preset length.

The Applicant has determined that, in order to minimize the gain tilt in the considered wavelength band, an optimum total length of the active fiber can be found, which is dependent on system parameters such as the signal input power and the erbium concentration in the active fiber, The Applicant has found that, with a power level of about 15–17 dBm at the input of amplifier 104 and with an erbium concentration in the active fiber of the amplifier 104 in the range indicated below, a total length of said active fiber between 10 m and 20 m allows to achieve an acceptably low gain tilt, the minimum gain tilt being achieved for a total fiber length of approximately 12 m.

Amplifier 104 further includes a first and a second pump laser 109, 110 for providing pump radiation to the amplification optical fiber 108, and a first and a second WDM optical coupler 111, 112 to couple light from the first and the second pump lasers 109, 110 into the amplification optical fiber 108.

Figure 17A:
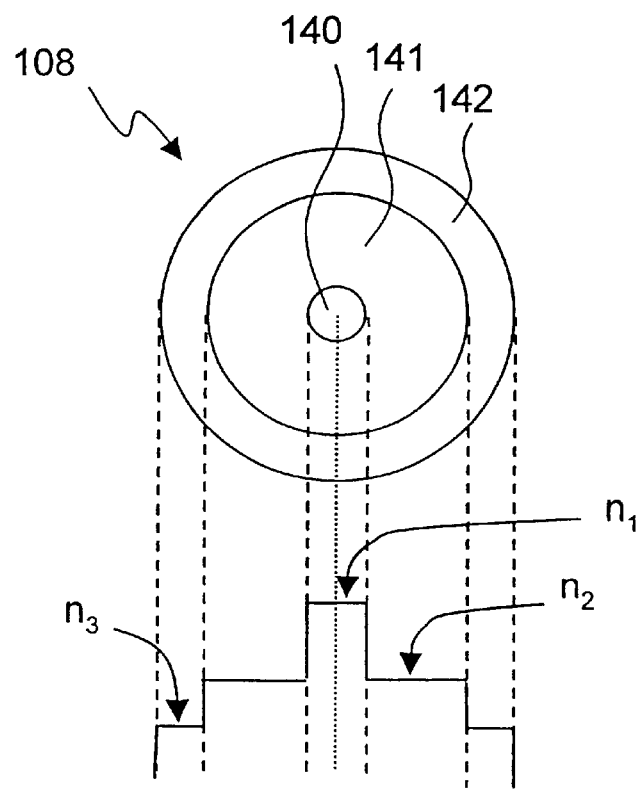
FIGS. 17a and 17b are schematic representations of a double cladding fibre used in the optical amplifying unit of the invention and of the multi-mode pumping operation of the double cladding fibre.
Figure 17B:
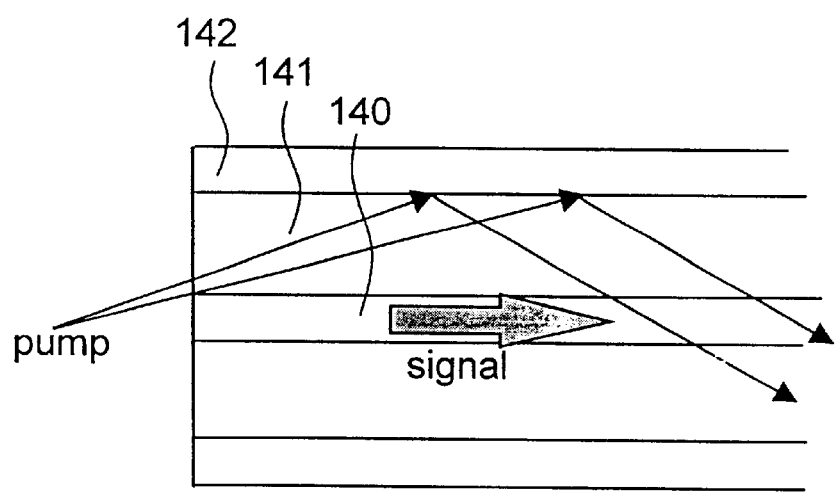

Optical fiber 108 is, preferably, a double-cladding fiber of the type hereinafter described with reference to FIG. 17*a*, where a not-in-scale section of optical fiber 108 is shown. Fiber 108 includes a core 140 having a first refraction index $n_1$, an inner cladding 141 that surrounds the core 140, is coaxial to the core 140 and has a second refraction index $n_2 < n_1$, and an outer cladding 142 that surrounds the inner cladding 141, is coaxial to the inner cladding 141 and has a third refraction index $n_3 < n_2$. As shown in FIG. 17*b*, under normal operating conditions of amplifying unit 100, while the transmitted signal is confined into the core 140, the pump radiation is fed into the inner cladding 141 and is progressively absorbed by the core 140, exciting the active medium. Fiber 108 has preferably an external diameter of the outer cladding 142 of 90 μm, an external diameter of the inner cladding 141 of 65 μm and an external diameter of the core 140 of about 5 μm. Core 140 is preferably made of $SiO_2/P_2O_5/Al_2O_3$ co-doped with Er/Yb. More precisely, core 140 preferably has a weight percentage of $P_2O_5$ greater than 10% (preferably about 20%), a weight percentage of $Al_2O_3$ less than 2%, a concentration of erbium between 600 ppm and 1000 ppm and a concentration of ytterbium between 1000 ppm and 20000 ppm. The ratio between ytterbium and erbium concentrations is preferably between 10:1 and 30:1, more preferably about 20:1. The refraction index difference between the core 140 and the inner cladding 141 is preferably $\Delta n = n_1 - n_2 = 0.013 +/- 0.002$ and the refraction index difference between the inner cladding 141 and the outer cladding 142 is preferably $\Delta n' = n_2 - n_3 = 0.017 +/- 0.003$ (due mainly to a fluorine doping of the outer cladding 142). The core 140 and the inner cladding 141 define a single-mode waveguide for the guidance of transmission signals, having a first numeric aperture $NA_1 = 0.19 +/- 0.02$, while the inner cladding 141 and the outer cladding 142 define a multi-mode waveguide for the guidance of pump radiation, having a second numeric aperture $NA_2 = 0.22 +/- 0.01$.

To produce fiber 108, two different preforms (not shown) are used. A first preform is used to obtain the core 140 and the inner cladding 141 and is made by depositing $SiO_2$ and $P_2O_5$ by means of the MCVD method (or by another known "chemical vapor deposition" (CVD) method) into a pure silica preform, and then by introducing Aluminium and rare earths erbium and ytterbium by means of the known "solution doping" method. The first preform is opportunely worked so as to obtain preset geometrical ratios between the core 140 and the inner cladding 141.

A second preform of a commercial-type is used to obtain the outer cladding 142. The second preform has a central region of pure $SiO_2$ and a surrounding region of fluorine-doped $SiO_2$. The central region of the second preform is removed so as to obtain a central longitudinal hole in which the first preform is introduced. The three-layer preform so obtained is drawn in the usual way to obtain the optical fiber 108.

Referring again to FIG. 9, pump lasers 109 and 110 are multi-mode broad-area lasers with an emission wavelength included in the wavelength range 920–980 nm, for example at 920 nm, each adapted to provide a pump power of approximately 400 mW to optical fiber 108. Pump lasers 109, 110 may be, for example, model number MECP7PR6 supplied by E-TEK DYNAMICS, INC., 1885 Lundy Ave., San Jose, Calif. (USA).

The first and the second coupler 111, 112 are micro optic (mirror-type) WDM couplers positioned at the opposite ends of optical fiber 108. Couplers 111, 112 may be, for example, model number FWDMCPR1PRS10 supplied by E-TEK DYNAMICS, INC., 1885 Lundy Ave., San Jose, Calif. (USA). Couplers 111 and 112 include respective first, second and third access fibers, indicated in the two cases with 111*a*, 111*b*, 111*c* and 112*a*, 112*b* and 112*c*. Each of couplers 111 and 112 further includes a converging lens system, not shown, to opportunely shape and direct the light beams among its access fibers, and a selective-reflection surface, e.g. a dichroic mirror, indicated respectively with 111*d* and 112*d* and represented schematically with an oblique segment. The actual inclination of the dichroic mirror inside the coupler depends on the direction of the incoming optical beams carrying the signal and the pump radiation. The selective-reflection surface in couplers 111 and 112 is transparent for the wavelengths of the RB2 band channels and reflecting for the wavelength of the pumping radiation. In this way, the RB2 band channels pass through the reflecting surface substantially without losses while the pump radiation is reflected by the reflecting surface into the cladding of the amplification fiber 108. Alternatively, each coupler 111, 112 may include a selective-reflection surface that is reflecting for the wavelengths of the RB2 band channels and transmissive for the wavelength of the pumping radiation.

Coupler 111 has its first access fiber 111a optically coupled to the output of pre-amplifier 103 (through isolator 105) to receive the pre-amplified RB2 band channels, its second access fibers 111b optically coupled to the pump laser 109 to receive the pump radiation and its third access fiber 111c optically coupled to the input of amplification fiber 108 to feed to fiber 108 both the RB2 band channels and the pump radiation, in a same propagation direction.

Coupler 112 has its first access fiber 112a optically coupled to output 102 (through isolator 105) to transmit to output 102 the amplified RB2 band channels, its second access fiber 112b optically coupled to the pump laser 110 to receive the pump radiation and its third access fiber 112c optically coupled to the output of amplification fiber 108 to receive from amplification fiber 108 the amplified RB2 band channels and to feed to fiber 108 the pump radiation generated by pump laser 110 in an opposite propagation direction with respect to the transmitted signals.

The first access fibers 111a and 112a are single-mode fibers having a core wavelength cutoff of 1300 nm±30 nm, a cladding diameter of 125 μm and a numeric aperture NA=0.2; the second access fibers 111b and 112b are multi-mode fibers having a core diameter of 65 μm, a cladding diameter of 90 μm and a numeric aperture NA=0.22; and the third access fibers 111c and 112c are double-cladding fibers having the same chemical and geometrical characteristics of amplification fiber 108, but no active ion doping.

Couplers 111 and 112 have an insertion loss of approximately 1.02 dB, measured at 1550 nm, for optical signals passing from the first access fiber 111a/112a to the third access fiber 111c/112c, or vice versa, and an insertion loss of approximately 0.22 dB, measured at 980 nm, for optical signals passing from the second access fiber 111b/112b to the third access fiber 111c/112c, or vice versa. Furthermore, couplers 111 and 112 have an optical isolation greater than 30 dB, measured at 980 nm, between the first access fiber 111a/112a and the third access fiber 111c/112c and an optical isolation greater than 20 dB, measured at 1550 nm, between the second and the third access fiber.

Figure 10A:
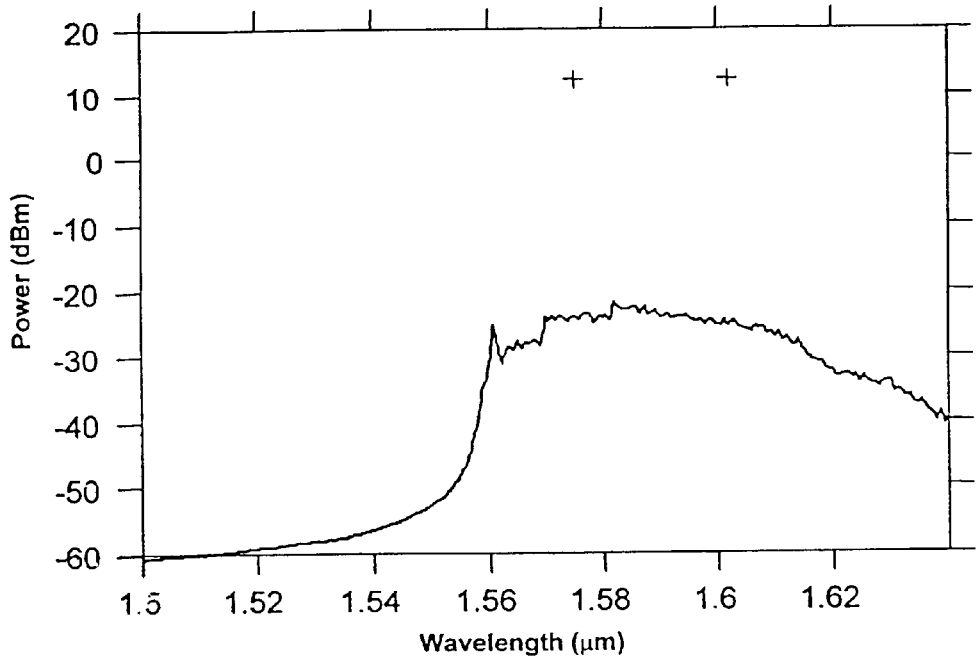
FIGS. 10a and 10b show numerical simulation results obtained with the optical amplifying unit of FIG. 9, in the case of a two channels transmission.
Figure 10B:
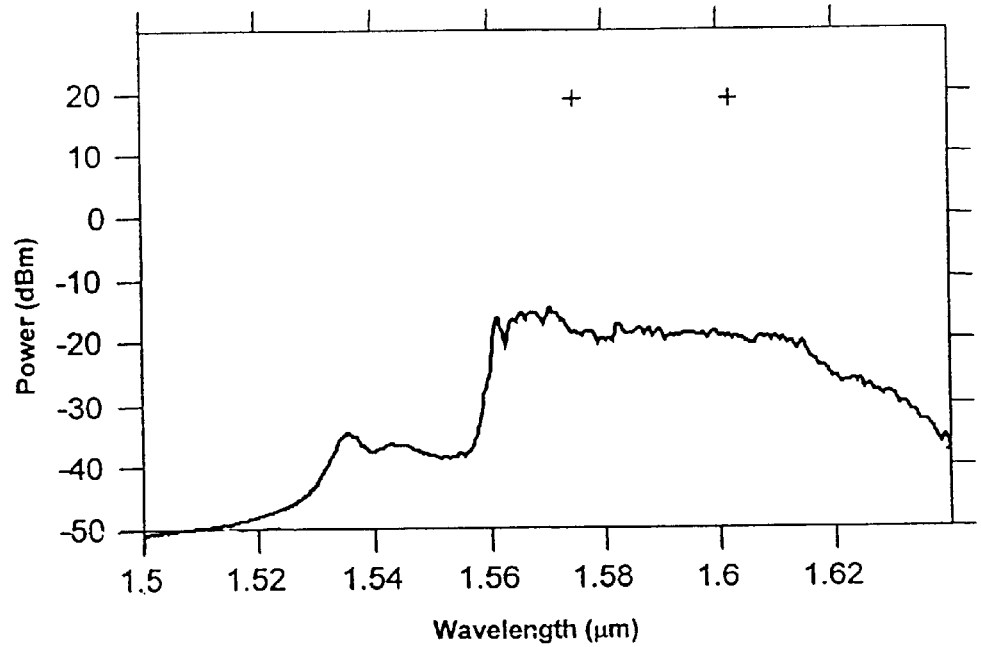

FIGS. 10a and 10b show a numerical simulation of a two-channel transmission through amplifying unit 100. The two channels have been chosen at 1575 nm and 1602 nm, i.e. at the extremes of the RB2 band, both with an input power (at the input 101) of −13.5 dBm. In particular, FIGS. 10a and 10b show the estimated spectrum and the estimated power levels of the two channels, represented in each figure by means of two different cross marks, at the output of pre-amplifier 103 and, respectively, at the output of amplifier 104.

Figure 11A:
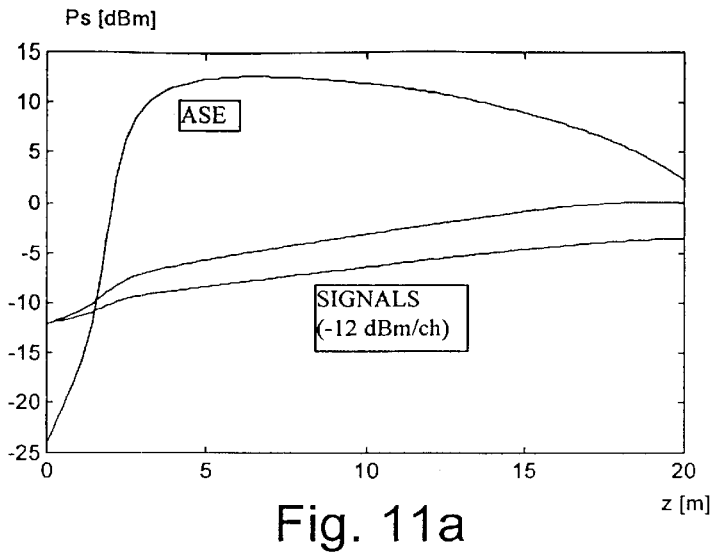
FIGS. 11a, 11b and 11c show further numerical simulation results obtained with the optical amplifying unit of FIG. 9, in the case of a two channels transmission.
Figure 11B:
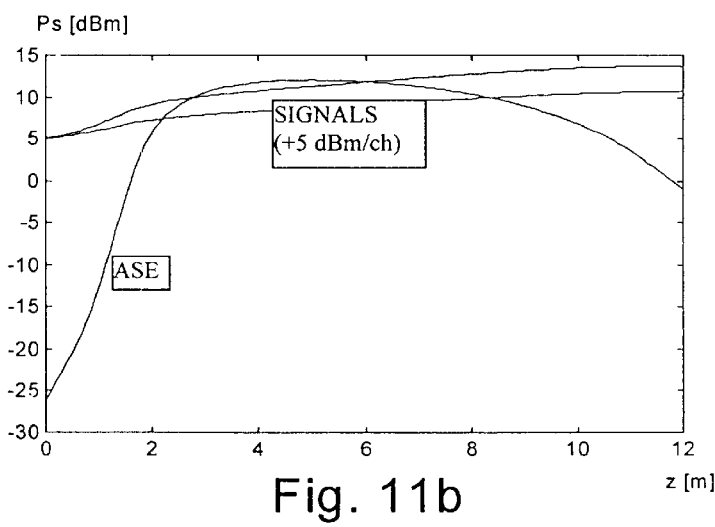
Figure 11C:
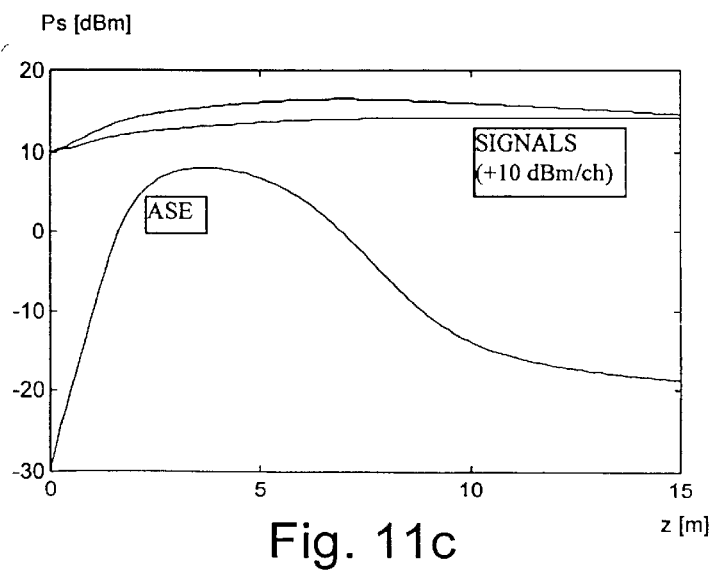

FIGS. 11a, 11b and 11c show further numerical results related to the transmission through optical amplifier 104 of the above two channels at 1575 nm and 1602 nm. In particular, this calculation simulates the transmission of the two channels through a line amplification section including an Er/Yb amplifier 104 not preceded by pre-amplifier 103. FIGS. 11a, 11b and 11c illustrate the dependence of the ASE (Amplified Stimulated Emission) and signal power on the length of the active Er/Yb fiber (z) for different input signal powers, respectively −12 dBm per channel, +5 dBm per channel and +10 dBm per channel. The results show that, in the absence of pre-amplifier 103, i.e. by using only Er/Yb co-doped amplifying fibers to amplify the RB2 band channels, signals with a power per channel of −12 dBm achieve a relatively low gain, so that limitations on the input signal power range are imposed. This is deemed to be due to the high fluorescence peak at 1536 nm of the Er/Yb co-doped fiber. In practice, if low signal powers in the bandwidth 1575 nm–1602 nm are fed directly to amplifier 104, the signal gain is saturated by the accumulation of amplified spontaneous emission (ASE), obtaining a low output power. The results then show that the use of a pre-amplifier, e.g. an erbium-doped pre-amplifier, is advantageous to ensure high saturated output power in the proposed configuration, since the use of only Er/Yb co-doped amplifying fibers impose a lower limit on the input signal (approximately 0 dBm) in order to ensure high amplifier efficiency and saturated output power. On the other hand, using the proposed combined configuration (Er-doped pre-amplifier and Er/Yb co-doped power amplifier) allows high efficiency and high saturated output power also for input powers down to −20 dBm. This strong saturation avoids excessive amplified spontaneous accumulation outside the signal bandwidth.

An alternative amplification stage that, however, is less preferred than the amplification scheme hereinbefore described, may include a cascaded connection of Er/Yb co-doped amplifying fibers, with the addition of filters to suppress the amplified spontaneous emission. This arrangement may be advantageously used as a power amplifier stage with relatively high-input power signals, but may suffer, according to the above, a substantial waste of energy, in particular in the first stage that receives input signals of very low power level and that tends then to generate high values of amplified spontaneous emission.

Figure 12A:
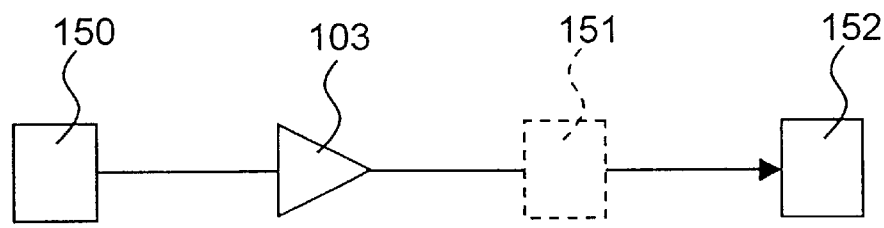
FIGS. 12a and 12b are schematic representations of experimental arrangements used to test the optical amplifying unit of FIG. 9.
Figure 12B:
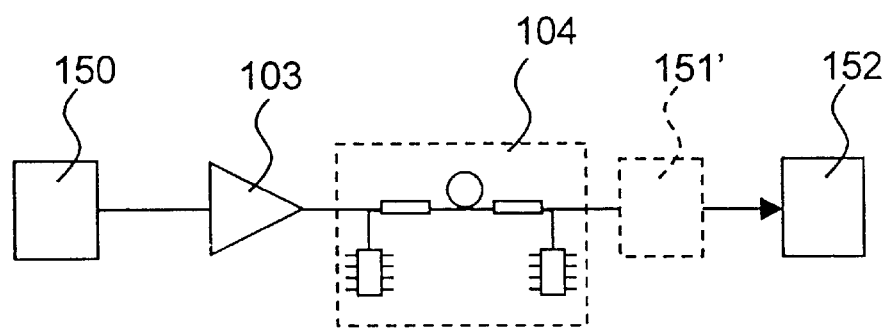

FIGS. 12a and 12b show experimental setups used to test amplifying unit 100. The experimental setup in FIG. 12a includes pre-amplifier 103, an optical generator 150 to launch optical signals into the input of pre-amplifier 103 and an optical spectrum analyzer 152 to detect the spectrum at the output of pre-amplifier 103. In particular, generator 150 is, preferably, an array of 64 lasers each generating a respective wavelength in the RB2 band. In the experimental setup of FIG. 12b, amplifier 104 has been added in series to pre-amplifier 103, and optical spectrum analyzer 152 now detects the spectrum at the output of amplifier 104. Attenuation filters 151 and 151' may be added in the experimental setups of FIGS. 12a and 12b for the safety of optical spectrum analyzer 152. Furthermore, a power meter (not shown) may be added in the experimental setups of FIGS. 12a and 12b to monitor the optical power at the output of pre-amplifier 103 and, respectively, of amplifier 104.

Figure 13A:
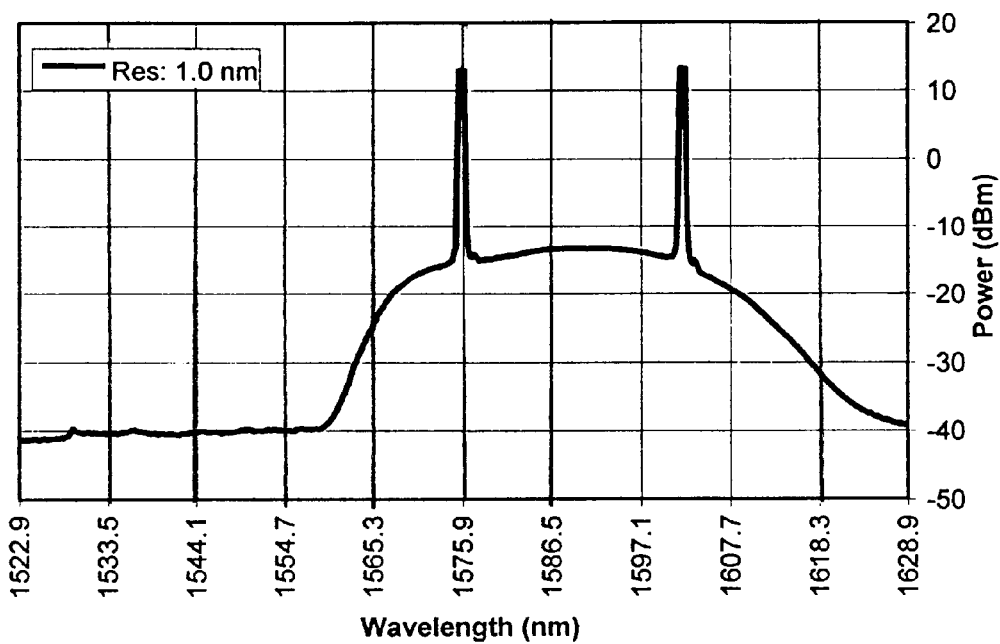
FIGS. 13a and 13b show experimental results obtained with the experimental arrangements of FIGS. 12a and 12b in the case of a two-channel transmission.
Figure 13B:
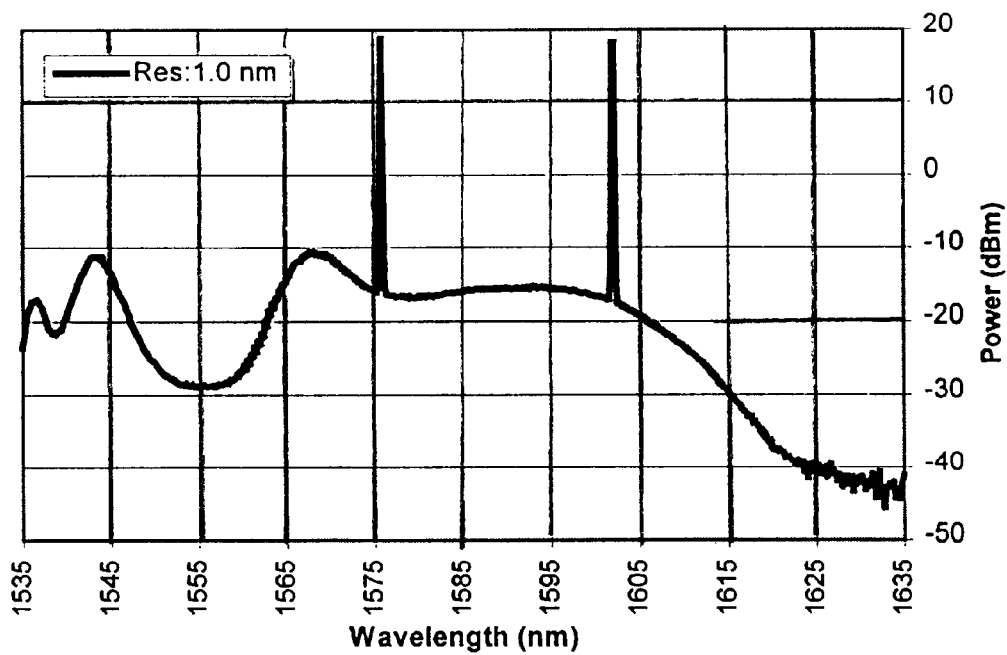

FIGS. 13a and 13b show the spectra detected at the output of pre-amplifier 103 and, respectively, of the amplifier 104, by means of optical spectrum analyzer 152, in response to an input signal including two channels at 1575 nm and 1602 nm with a total power of approximately −10.5 dBm (equivalent to a power of approximately −13.5 dBm per channel). No attenuation filter is included in this case because the optical power at the output of pre-amplifier 103 and, respectively, of amplifier 104, is not dangerous for the spectrum analyzer 152.

In the spectra of FIGS. 13a and 13b, the power peaks of the two detected channels are superimposed to the power emission of pre-amplifier 103 and, respectively, to the combined power emissions of pre-amplifier 103 and amplifier 104. These experimental results confirm the numerical results of FIGS. 10a, 10b. In particular, the experimental results of FIG. 13b show that, in all the RB2 band, the amplifying unit 100 can amplify a −10.5 dBm input power signal (such as a signal including two −13.5 dBm channels) to reach a total saturation output of approximately 23 dBm. In other words, a power gain greater than 33 dB has been obtained for input signals in the RB2 band and with an input optical power of approximately −10 dBm. The gain spectrum curve in the RB2 band of the cascaded pre-amplifier 103 and amplifier 104 arrangement is approximately flat and has a variation of 0.55 dB between the two ends of the RB2 band at 1575 nm and 1602 nm.

Figure 14A:
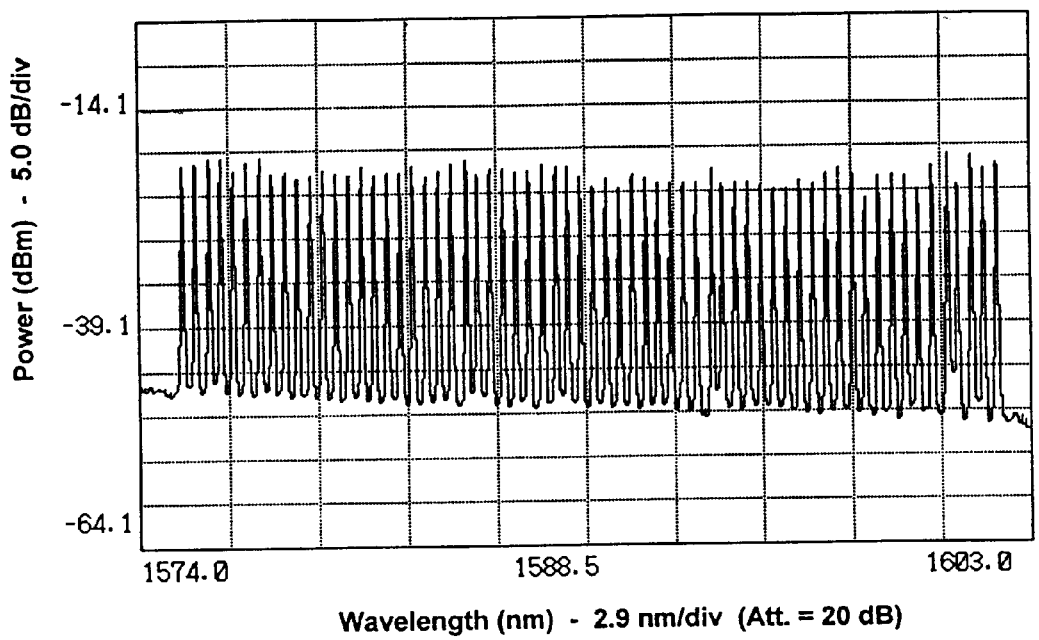
FIGS. 14a and 14b show experimental results obtained with the experimental arrangements of FIGS. 12a and 12b (but introducing different attenuation) in the case of a sixty-four (64) channels transmission.
Figure 14B:
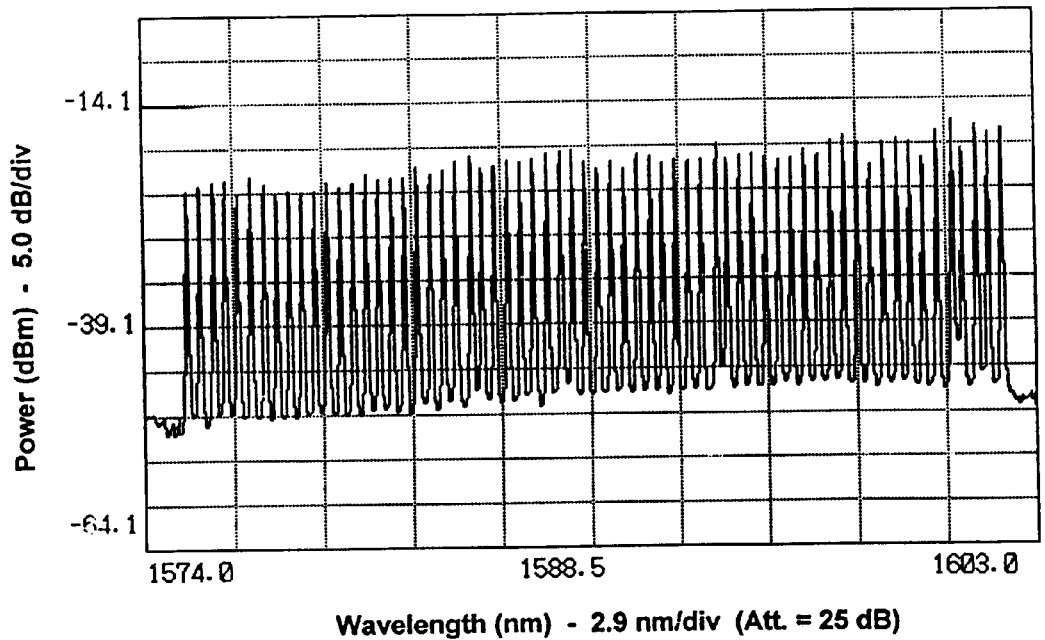

FIGS. 14a and 14b show the experimental power spectra detected with the arrangements of FIGS. 12a and 12b in the case of a sixty-four (64) channels transmission and with a total input signal power of approximately −9.5 dBm. In this case, attenuation filters 151 (20 dB attenuation) and 151' (25 dB attenuation) have been added for the safety of optical spectrum analyzer 152. A saturation output power of approximately 22 dBm has been detected at the output of amplifier 104 by the power meter with the arrangement of FIG. 12b. This power is slightly lower than that detected in the case of a two channel transmission. The observed power difference in the two experiments is probably due to the different characteristics of the pre-amplifier and of the optical connectors used in the two experiments and not to the difference in the number of channels composing the signals. This leaves room for further optimization, for example by improving the amplifier design or by increasing the pump power, so as to reach higher saturated output powers. In particular, the Applicant has determined that, by increasing the pump power above 400 mW and by optimizing the optical connections, output powers up to 26 dBm can be reached with an input power of approximately −10 dBm.

The experimental results of FIGS. 13 and 14 show that, when the optical signals have an input power around approximately −10.5 dBm or −9.5 dBm and wavelengths between 1575 nm and 1602 nm, the optical amplifying unit of the invention allows a power gain greater than 25 dB. In particular, with the optical amplifying unit of the invention operating in the mentioned conditions (i.e. with an input power of at least −10.5 dBm), a power gain greater than 31 dB, and in particular greater than 33 dB, has been demonstrated. These values are much higher than the observed 29 dB limit of erbium-doped amplifiers in the same conditions.

Figure 15:
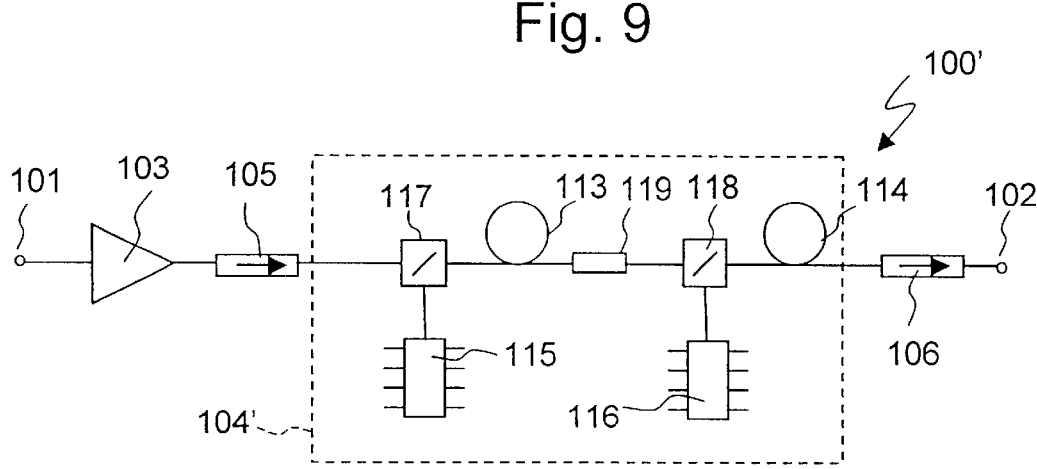
FIG. 15 is a schematic representation of a second embodiment of the optical amplifying unit according to the invention.

In FIG. 15 a second embodiment of an amplifying unit for use in the optical transmission system 1 to amplify the RB2 band is illustrated. Amplifying unit 100' of FIG. 15 differs from amplifying unit 100 of FIG. 9 only in the structure of erbium/ytterbium amplifier, here indicated with 104'. The other optical components of amplifying unit 101' are indicated with the same reference numbers as the corresponding components in FIG. 9.

Amplifier 104' is a double stage amplifier with co-propagating pumping, including a first and a second amplification fiber 113, 114 doped with erbium and ytterbium, a first and a second pump laser 115, 116 to provide pump radiation to the first and, respectively, the second amplification optical fiber 113, 114, a first and a second micro optic (mirror-type) WDM optical coupler 117, 118 to optically couple the first and, respectively, the second pump laser 115, 116 to the first and, respectively, the second amplification optical fiber 113, 114, and, preferably, a noise rejection filter 119, positioned between the two amplification stages, to suppress part of the amplified spontaneous emission of amplification fibers 113, 114.

First and second amplification fiber 113, 114 may for example include two stretches of a same erbium/ytterbium fiber, preferably of the same type of fiber 108 of FIG. 9. Fiber lengths may be chosen depending on the system requirements.

Pump lasers 115, 116 are multi-modal lasers, for example of the same type of pump lasers 109, 110, and provide a pumping radiation between 920 nm and 980 nm with a pumping power of approximately 400 mW.

Couplers 117, 118 are micro optics couplers of the same type of couplers 111 and 112 in FIG. 9. In particular, each of the micro optic couplers 117 and 118 includes a converging lens system and a selective-reflection surface that is, for example, transparent for the wavelengths of the RB2 band channels and reflecting for the wavelength of the pumping radiation. In this way, the RB2 band channels pass through the reflecting surface substantially without losses while the pump radiation is reflected by the reflecting surface into the cladding of the amplification fiber 113 and, respectively, 114, in the same direction with respect to the transmitted signals.

Noise rejection filter 119 is positioned between the amplification fiber 113 and the coupler 118 and is adapted to filter the amplified spontaneous emission of amplification fibers 113, 114 so as to improve the performances of amplifying unit 100' in terms of output power and in terms of channel equalization. Another rejection filter (not shown) may be positioned between isolator 106 and output 102, in alternative or in addition to filter 119. Amplifying section 100' can provide a saturation output power of approximately 22 dBm with an input signal power of approximately −10 dBm.

Figure 16:
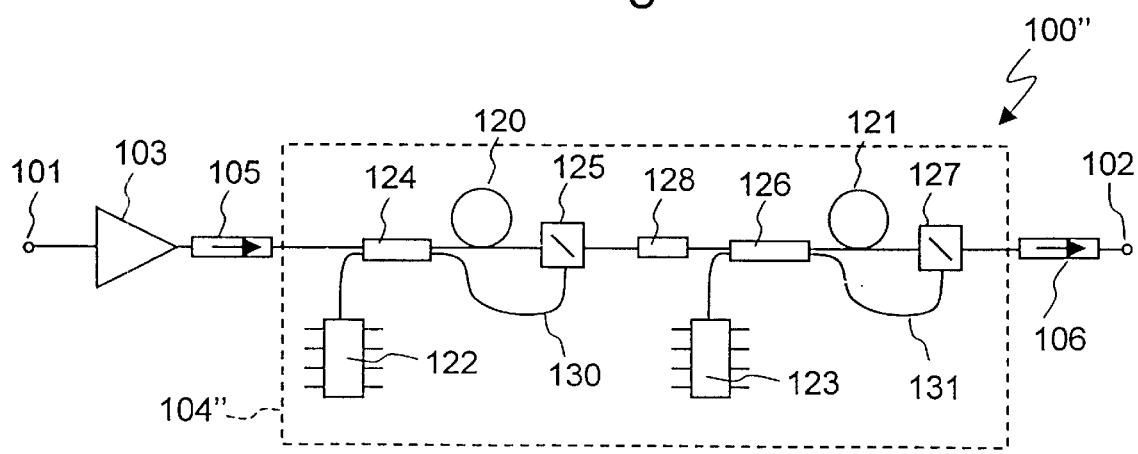
FIG. 16 is a schematic representation of a third embodiment of the optical amplifying unit according to the invention.

FIG. 16 shows a third embodiment of an amplifying unit adapted to be used in system 1 to amplify the RB2 band. Amplifying unit 100" of FIG. 15 differs from amplifying units 100 of FIG. 9 and 100' of FIG. 15 only in the structure of erbium/ytterbium amplifier, here indicated with 104". The other optical components of amplifying unit 100" are indicated with the same reference numbers as the corresponding components in FIG. 9 and FIG. 15.

Amplifier 104" is a double stage amplifier with bi-directional pumping, including a first and a second amplification fiber 120, 121 co-doped with erbium and ytterbium, a first and a second pump laser 122, 123 to provide pump radiation to the first and, respectively, the second active fiber 120, 121, a first and a second WDM optical coupler 124, 125 to bi-directionally couple the first pump laser 122 to the first fiber 120, a third and a forth WDM optical coupler 126, 127 to bi-directionally couple the second pump laser 123 to the second fiber 121, and a noise rejection filter 128 to suppress part of the amplified spontaneous emission of fiber 120, 121.

First and second active fibers 120, 121 are preferably double-clad fibers of the same type of fiber 108 in FIG. 9, having respective lengths that may be chosen depending on the system requirements. Pump lasers 122, 123 are multi-modal lasers, for example of the same type of pump lasers 109, 110, providing a pumping radiation between 920 nm and 980 nm with a pumping power of 400 mW.

Couplers 124–127 are adapted to feed the pump radiation into the inner cladding of the active fibers 120, 121. Couplers 124 and 126 are preferably fused fiber WDM couplers of the type 960/1550 nm or 920/1550 nm. For example, couplers 124 and 126 are model MW9850-P05 made by the Applicant. In details, coupler 124 is interposed between pump laser 122 and fiber 120 and coupler 126 is interposed between pump laser 123 and fiber 121. Each of the couplers 124, 126 has a first access fiber to receive the RB2 band channels, a second access fiber to receive the pump radiation, a third access fiber to feed to the corresponding amplification fiber 120, 121 both the RB2 band channels and approximately 50% (typically about 48%) of the power of the pump radiation and a fourth access fiber in which the residual pump radiation (approximately 50% of the power of the pump radiation) is conveyed. Preferably, the first and the third access fibers are opposite end portions of a same double-clad fiber, while the second and the fourth access fibers are opposite end portions of a same multi-modal fiber.

Couplers 125 and 127 are preferably micro optic (mirror-type) WDM couplers of the same type of couplers 111 and 112 of FIG. 9, each positioned on the opposite side of the corresponding fiber amplifier 120, 121 with respect to the corresponding fused fiber coupler 124, 126. Each micro optic coupler 125, 127 has a first access fiber optically coupled to the active fiber 120 and, respectively, 121; a second access fiber optically coupled to the fourth access fiber of the corresponding fused fiber coupler 124, 126 by means of a respective optical fiber 130, 131, to receive the residual pump radiation and to transmit it into the respective active fiber 120, 121 in a counter-propagating direction, with a loss not greater than 0.3 dB, more precisely about 0.22 dB; and a third access fiber for conveying the amplified transmission signals. Each micro optic coupler 125, 127 has a signal pass-band including the RB2 band so that the RB2 band channels are transmitted with a very low loss.

The particular coupling arrangement hereinbefore described is adapted to feed to each fiber amplifier 120, 121 about 85% of the pump power generated by the respective pump laser 122, 123 and provides therefore a very high efficiency pumping.

Like the amplifying section 100' of FIG. 15, the amplifying section 100" is adapted to provide a saturation output power up to 22 dBm with input powers of approximately −10 dBm.

It will be understood that various changes in the details, materials, steps and arrangements of parts that have been described and illustrated above in order to explain the nature of the invention may me made by those of ordinary skill in the art within the principle and scope of the present invention as expressed in the appended claims.

For example, a transmission system can be made having a transmission wavelength band which includes all and only the RB2 band, or part of the RB2 band or a band including the RB2 band. A transmission system adapted to transmit only in the RB2 band may for example comprise a transmitting unit for generating sixty-four channels spaced by 50 GHz at 2.5 Gbit/s, an optical link coupled at one end to the transmitting unit and a receiving unit coupled to another end of the optical link.

The optical link may have fiber spans even longer than 130 km between subsequent amplification stages, each fiber span introducing an approximate loss of 28 dB (using fibers with loss about 0.22 dB/km).

What is claimed is:

1. Optical transmission system including an optical transmitting unit adapted to transmit an optical signal in a transmission wavelength band above 1570 nm, an optical receiving unit to receive said optical signal, an optical fiber link optically coupling said transmitting unit to said receiving unit and an optical amplifying unit coupled along said link, said optical amplifying unit having an amplification wavelength band including said transmission wavelength band and comprising an input for the input of said optical signal from said link, an output for the output of said optical signal into said link and an optical amplifier interposed between said input and said output to amplify said optical signal, said optical amplifier including an amplification fiber, a pump source for generating pump radiation and an optical coupler for optically coupling said pump source and said amplification fiber, characterized in that said amplification fiber includes an optical fiber co-doped with erbium and ytterbium.

2. Optical transmission system according to claim 1, wherein said optical amplifying unit has a power gain greater than 29 dB when said optical signal has an input power of at least −10.5 dBm and wavelength within said amplification wavelength band.

3. Optical transmission system according to claim 1, wherein said optical amplifying unit has a power gain of at least 31 dB when said optical signal has an input power of at least −10.5 dBm and wavelength within said amplification wavelength band.

4. Optical transmission system according to claim 1, wherein said optical amplifying unit has a power gain of at least 33 dB when said optical signal has an input power of at least −10.5 dBm and wavelength within said amplification wavelength band.

5. Optical transmission system according to claim 1, wherein the width of said amplification wavelength band is at least 15 nm.

6. Optical transmission system according to claim 1, wherein the width of said amplification wavelength band is at least 27 nm.

7. Optical transmission system according to claim 1, wherein a lower wavelength limit of said amplification wavelength band is greater than or equal to 1575 nm.

8. Optical transmission system according to claim 1, wherein said optical amplifying unit has a gain variation lower than 1 dB within said amplification wavelength band.

9. Optical transmission system according to claim 1, further comprising an optical pre-amplifier interposed between said input of said optical amplifying unit and said optical amplifier to pre-amplify said optical signal.

10. Optical transmission system according to claim 1, wherein said amplification fiber has a core comprising $SiO_2$, $P_2O_5$, $Al_2O_3$ and is codoped with Er/Yb.

11. Optical transmission system according to claim 1 or 10, wherein said amplification fiber has a core having a concentration of erbium between approximately 600 ppm and 1000 ppm.

12. Optical transmission system according to claim 1 or 10, wherein said amplification fiber has a core having a concentration of ytterbium between approximately 1000 ppm and 20000 ppm.

13. Optical transmission system according to claim 1 or 10, wherein said amplification fiber has a core having a ratio between ytterbium and erbium concentrations between approximately 5:1 and 30:1.

14. Optical transmission system according to claim 1 or 10, wherein said amplification fiber has a core having a weight percentage of $P_2O_5$ greater than 10% and a weight percentage of $Al_2O_3$ less than 2%.

15. Optical transmission system according to claim 1, wherein said amplification fiber has a length lower than 30 m.

16. Optical transmission system according to claim 1, wherein said amplification fiber has a length lower than 13 m.

17. Optical transmission system according to claim 1, wherein said amplification fiber is a double-clad fiber having a core, an inner cladding surrounding the core and an outer cladding surrounding said inner cladding.

18. Optical transmission system according to claim 1, wherein said pump source has an emission wavelength between 920 and 980 nm.

19. Optical transmission system according to claim 1, wherein said pump source is a multi-mode broad-area laser.

20. Optical transmission system according to claim 1, wherein said optical amplifier is a single-stage fiber amplifier with bidirectional pumping, including one amplification fiber, two pump sources and two optical couplers which are coupled to opposite ends of said amplification fiber and each of which couples a respective one of said two pump sources to said amplification fiber.

21. Optical transmission system according to claim 20, wherein said two optical couplers are micro optic WDM couplers.

22. Optical transmission system according to claim 1, wherein said optical amplifier is a double-stage amplifier with copropagating pumping, each stage of said double-stage amplifier including an amplification fiber, a pump source and an optical coupler.

23. Optical transmission system according to claim 22, wherein said coupler in each stage of said double-stage amplifier is a micro optic WDM coupler.

24. Optical transmission system according to claim 1, comprising a plurality of optical transmission units at different wavelengths.

25. Optical transmission system according to claim 1, wherein said optical link includes optical fiber spans having a length of at least 130 km.

26. Optical transmission system according to claim 1, wherein the system has a wavelength transmission band with a width of at least 53 nm.

27. Method for transmitting optical signals, comprising:
   generating an optical signal having a wavelength in a wavelength band, said wavelength band having a lower limit greater than 1570 nm;
   feeding said signal to an optical link;
   amplifying said signal along said optical link;
   receiving said optical signal from said optical link;
   characterized in that said step of amplifying comprises feeding said signal into an active fiber co-doped with erbium and ytterbium.

28. Method according to claim 27, characterized in that said step of feeding comprises feeding said signal into one end of said active fiber with an input power of at least −10.5 dBm, said active fiber having a length, an erbium concentration and an ytterbium concentration such that the optical power of said optical signal at the opposite end of said active fiber is at least 29 dB.

29. Method according to claim 27, characterized in that said step of feeding comprises feeding said signal into one end of said active fiber with an input power of at least −10.5 dBm, said active fiber having a length, an erbium concentration and an ytterbium concentration such that the optical power of said optical signal at the opposite end of said active fiber is at least 31 dB.

30. Method according to claim 27, wherein said wavelength band has a width of at least 27 nm.

31. Method according to claim 27, further comprising the step of pre-amplifying said optical signal before feeding said optical signal to said active fiber.

32. Method according to claim 27 or 31, further comprising the step of pumping said active fiber with a multi-mode pump radiation having a wavelength between 920 and 980 nm.

33. Optical amplifying unit for amplifying optical signals in an optical transmission system, said optical amplifying unit having an amplification wavelength band with a lower wavelength limit greater than 1570 nm and with a width of at least 15 nm, and including an amplification fiber, a pump source for generating pump radiation and an optical coupler for optically coupling said pump source to said amplification fiber, characterized in that said amplification fiber includes an optical fiber co-doped with erbium and ytterbium.

* * * * *